(12) United States Patent
Robert Jose et al.

(10) Patent No.: US 12,292,917 B2
(45) Date of Patent: May 6, 2025

(54) SYSTEMS AND METHODS TO PUBLISH NEW CONTENT

(71) Applicant: Adeia Guides Inc., San Jose, CA (US)

(72) Inventors: Jeffry Copps Robert Jose, Tamil Nadu (IN); Ankur Anil Aher, Maharashtra (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/487,873

(22) Filed: Sep. 28, 2021

(65) Prior Publication Data

US 2023/0095935 A1    Mar. 30, 2023

(51) Int. Cl.
  *G06Q 30/00* (2023.01)
  *G06F 16/45* (2019.01)
  *G06F 16/487* (2019.01)
  *G06F 16/958* (2019.01)

(52) U.S. Cl.
  CPC ............ *G06F 16/45* (2019.01); *G06F 16/487* (2019.01); *G06F 16/958* (2019.01)

(58) Field of Classification Search
  CPC ...... G06F 16/45; G06F 16/487; G06F 16/958; G06F 16/09
  See application file for complete search history.

(56) References Cited

U.S. PATENT DOCUMENTS

| | | | |
|---|---|---|---|
| 9,323,850 B1 | 4/2016 | Lewis et al. | |
| 10,152,544 B1 | 12/2018 | Friggeri et al. | |
| 10,292,003 B2 * | 5/2019 | Dowlatkhah | H04W 12/062 |
| 10,535,081 B2 * | 1/2020 | Ferreira | G06Q 50/01 |
| 10,846,353 B2 * | 11/2020 | Rayanchu | G06F 40/205 |
| 11,238,120 B1 * | 2/2022 | Petersen | H04L 67/10 |
| 11,445,326 B2 * | 9/2022 | Davis | H04W 4/021 |
| 12,079,265 B2 | 9/2024 | Robert Jose et al. | |
| 2013/0268479 A1 | 10/2013 | Andler et al. | |
| 2014/0040245 A1 | 2/2014 | Rubinstein et al. | |
| 2014/0289216 A1 | 9/2014 | Voellmer et al. | |
| 2015/0120717 A1 | 4/2015 | Kim et al. | |
| 2015/0185268 A1 * | 7/2015 | Falk | G01R 31/00 702/117 |
| 2016/0042284 A1 | 2/2016 | Menczer et al. | |
| 2016/0300252 A1 | 10/2016 | Frank et al. | |
| 2017/0039205 A1 * | 2/2017 | Rayanchu | G06Q 30/0256 |
| 2017/0277790 A1 | 9/2017 | Alonso et al. | |

(Continued)

OTHER PUBLICATIONS

Raizada et al., "Smoothness without smoothing: why Gaussian naive Bayes is not naive for multi-subject searchlight studies," PLOS One, 8(7): e69566 (2013).

*Primary Examiner* — Tuankhanh D Phan
(74) *Attorney, Agent, or Firm* — Haley Guiliano LLP

(57) ABSTRACT

Systems and methods publishing content are disclosed herein. A content item for publication on a multimedia platform is received, and a first plurality of users within a first radius are detected. The content item is published to the first plurality of users and first data of the interaction of the first plurality of users with the content item is collected. Thereafter, an engagement score based on the first data is calculated. In response to the engagement score being above a first threshold, a second plurality of users within a second radius is detected, wherein the second radius is larger than the first radius and publishing the content item to the second plurality of users.

18 Claims, 14 Drawing Sheets

(56) References Cited

U.S. PATENT DOCUMENTS

| | | | |
|---|---|---|---|
| 2017/0352063 A1* | 12/2017 | Rao | G06Q 30/0255 |
| 2017/0364963 A1* | 12/2017 | Rao | G06Q 30/0273 |
| 2019/0026786 A1* | 1/2019 | Khoury | G06Q 30/0271 |
| 2019/0197125 A1 | 6/2019 | Ma et al. | |
| 2020/0228854 A1 | 7/2020 | O'Connell et al. | |
| 2021/0042796 A1 | 2/2021 | Khoury et al. | |
| 2021/0049441 A1 | 2/2021 | Bronstein | |
| 2023/0104187 A1 | 4/2023 | Robert Jose et al. | |

\* cited by examiner

| Virality Factor or Content "Genes" | Instances of Virality Factor in Content Item | Weight | Weighted Virality Factor |
|---|---|---|---|
| Filter 910 | M | 4 | 4m |
| Genre | N | 3 | 3n |
| Embedded Background Music | P | 2 | 2p |
| Number of Views | Q | 3 | 3q |
| Number of Likes | u | 7 | 7u |
| ... | ... | ... | ... |

SYSTEMS AND METHODS TO PUBLISH NEW CONTENT

BACKGROUND

The present disclosure relates to the virality of content circulated over a communication network and, more particularly, to systems and related processes for auto-publishing or posting content based on real-time analysis of actions and trending topics on various platforms and calculating the virality of a content item.

SUMMARY

In some cases, when content such as audio content, video content, audio/video content, image content, textual content (for example, a tweet and/or emoji), or any other type of electronically communicable content, is uploaded to the Internet, it is desirable for the content to become viral, or widely and rapidly circulated, liked, commented on, shared, viewed, or the like among internet users. Conventionally, when content is generated it remains unknown whether, and to what extent, the content will become viral upon being uploaded to the Internet. In addition, options for understanding the likelihood of virality of content or content items are limited and require user involvement.

Moreover, when distributing content to users, platforms typically identify trending content or content that is going viral, to users on the platform in a dedicated trending section or the like. However, this identification is typically based on a rate of views or comments. Thus, most or all of the content made by those with a large following will often be present in the trending section, and those with a smaller following will not be present in the trending section—irrespective of the quality of the content.

In view of the foregoing, the present disclosure provides systems and related methods that are able, upon the uploading of content to a platform, to predict whether, and to what extent, the content item is likely to become viral, and provide an auto-publishing system to publish the content at a time most likely to maximize the chance of virality. The systems and methods described herein are also able to determine a virality score of content that has been uploaded by determining a plurality of "genes," which may be considered as themes or traits that the content has.

Moreover, the present disclosure also provides systems and related methods that distribute content based on an engagement by the viewers with the content. In particular, distributing the content based on the number of users within a radius of a geographic location and increasing the radius of distribution based on the engagement.

In a first approach, there is provided a method for calculating the likelihood of virality of a content item, the method comprising: collecting first data from a first content item; collecting second data from a second content item; plotting a continuous probability distribution of the first data; plotting a continuous probability distribution of the second data; calculating, using the continuous probability distribution of the first data and the second data, a virality score for a third content item; and in response to the virality, score being greater than a first threshold, classifying the third content item as likely to be viral and queueing the third content item for auto-publishing.

In some examples, the first content item is a viral content item. In some examples, the second content is not a viral content item.

In some examples, the method further comprises: identifying a first parameter common to the first data and second data; calculating a mean value and standard deviation of the first parameter, and wherein plotting the continuous probability distribution of the first data and second data is based on the mean value and standard deviation of the first parameter common to the first data and the second data.

In some examples, the first parameter is one of a number of likes, a number of dislikes, a number of comments, a number of views, a representation of user engagement, a watch time, a number of shares, an indication of music, an identification of an object, an identification of a place, an identification of people, and identification of an animal, an identification of an action, an identification of writing, an identification of known landmarks, length of the content item, the topic of the content item, or natural language processing data. In addition, the first parameter may comprise an indication of the number of times the topic has even been trending or popular, which days/times, which platforms, and some author's profile data (e.g., a number of followers, subscribers or the like).

In some examples, the method further comprises calculating a prior probability of virality based on the first parameter common to the first data and second data.

In some examples, the method further comprises collecting third data from the third content item, wherein the third data comprises the first parameter; and comparing the first parameter of the third data to the continuous probability distributions of the first data and second data.

In some examples, the method further comprises calculating a first probability of likelihood of the first parameter given that the third content item is viral; and calculating a second probability of likelihood of the first parameter given that the third content item is not viral.

In some examples, calculating the virality score is based on a ratio of the first probability and second probability.

In some examples, the method further comprises, in response to the virality score being lower than the first threshold, classifying the third content item as not likely to be viral and publishing the third content item immediately.

In another approach, there is provided a media device comprising a control module, a transceiver module and a network module, configured to collect first data from a first content item; collect second data from a second content item; plot a continuous probability distribution of the first data; plot a continuous probability distribution of the second data; calculate, using the continuous probability distribution of the first data and the second data, a virality score for a third content item; and in response to the virality score being greater than a first threshold, classify the third content item as likely to be viral and queueing the third content item for auto-publishing.

In another approach, there is provided a system for calculating the virality of a content item, the system comprising: means for collecting first data from a first content item; means for collecting second data from a second content item; means for plotting a continuous probability distribution of the first data; means for plotting a continuous probability distribution of the second data; means for calculating, using the continuous probability distribution of the first data and the second data, a virality score for a third content item; and in response to the virality score being greater than a first threshold, means for classifying the third content item as likely to be viral and queueing the third content item for auto-publishing.

In another approach, there is provided a non-transitory computer-readable medium having instructions encoded thereon for carrying out a method, the method comprising: collecting first data from a first content item; collecting second data from a second content item;

plotting a continuous probability distribution of the first data; plotting a continuous probability distribution of the second data; calculating, using the continuous probability distribution of the first data and the second data, a virality score for a third content item; and in response to the virality, score being greater than a first threshold, classifying the third content item as likely to be viral and queueing the third content item for auto-publishing.

In another approach, there is provided a method of publishing content, the method comprising: receiving a content item for publication on a multimedia platform; detecting a first plurality of users within a first radius; publishing the content item to the first plurality of users; collecting first data of the interaction of the first plurality of users with the content item; calculating an engagement score based on the first data; and in response to the engagement score being above a first threshold, detecting a second plurality of users within a second radius, wherein the second radius is larger than the first radius, and publishing the content item to the second plurality of users.

In some examples, the method further comprises determining a location associated with the content item, wherein the first and second radius are concentric with the location associated with the content item.

In some examples, the location is determined by at least one of receiving an indication of the location from the user, detecting location metadata, or via a GPS.

In some examples, the method further comprises: collecting second data of the interaction of the second plurality of users with the content item; updating the engagement score based on the second data; and in response to the engagement score being above a second threshold, detecting a third plurality of users within a third radius, wherein the third radius is larger than the second radius, and publishing the content item to the third plurality of users.

In some examples, the first plurality of users comprises idle users.

In some examples, the first data comprises a number of likes, a number of dislikes, a number of comments, a number of views, a representation of user engagement, a watch time, a number of shares, an indication of music, an identification of an object, an identification of a place, an identification of people, and identification of an animal, an identification of an action, an identification of writing, an identification of known landmarks, length of the content item, the topic of the content item, or natural language processing data.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
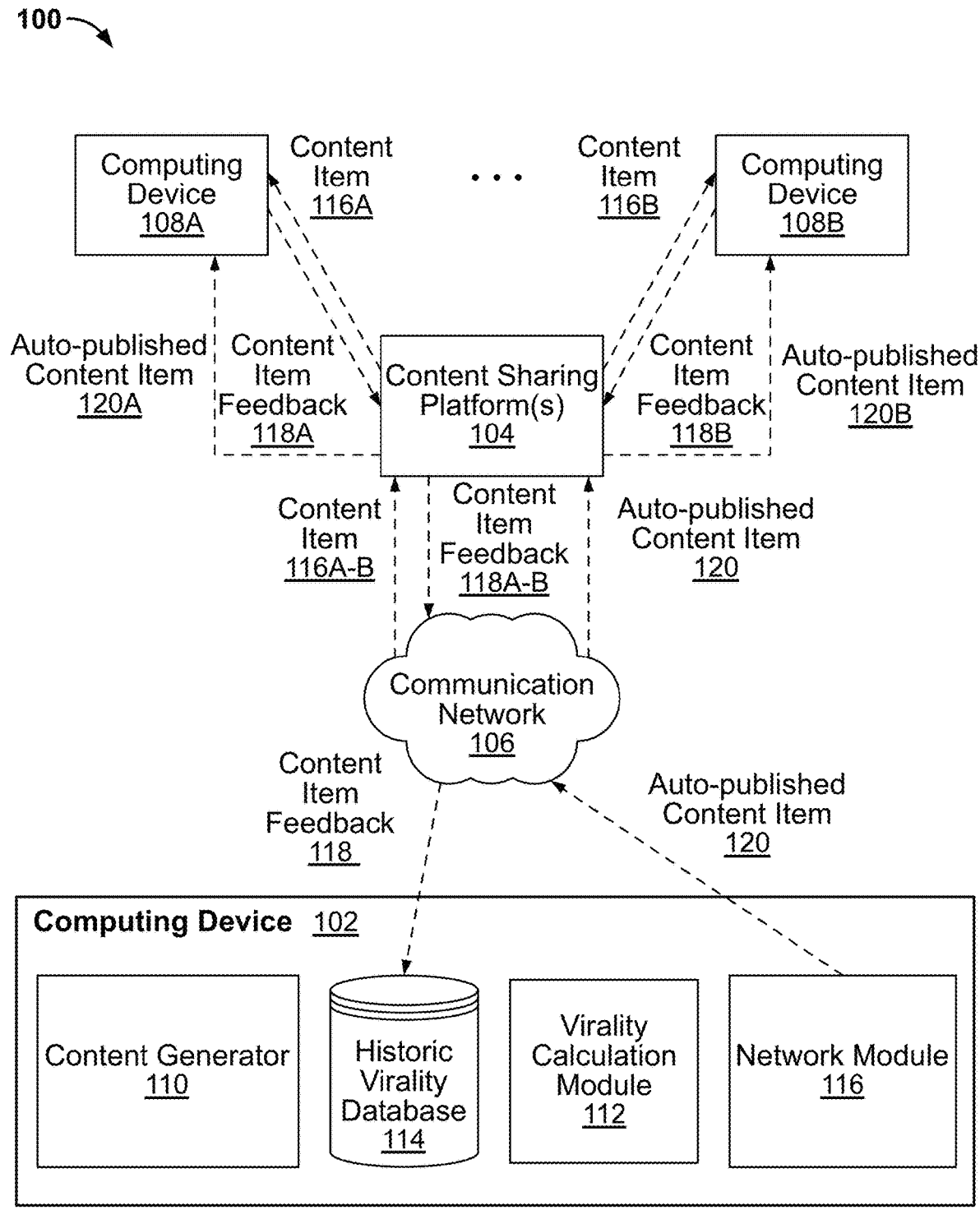
FIG. 1 shows an illustrative block diagram of a system for calculating the virality of a content item, in accordance with some embodiments of the disclosure.

FIG. 1 shows an illustrative block diagram of a system that is able, upon the uploading of content to a platform, to predict whether, and to what extent, the content item is likely to become viral, and provide an auto-publishing system to publish the content at a time most likely to maximize the chance of virality, as will be described in more detail throughout the present disclosure. In addition, the system of FIG. 1 may also distribute content based on an engagement by the viewers with the content, as will be described in more detail with reference to FIGS. 11 to 16.

Although FIG. 1 shows system 100 as including a number and configuration of individual components, in some embodiments, any number of the components of system 100 may be combined and/or integrated as one device. System 100 includes computing device 102, one or more content sharing platforms 104, computing device(s) 108, and communication network 106. Computing device 102 and computing devices 108A-B are communicatively coupled to content sharing platform 104 via communication network 106, although FIG. 1 only shows one instance of communication network 106 to avoid overcomplicating the drawing. Communication network 106 may be any type of communication network, such as the Internet, a mobile phone network, a mobile voice or data network (e.g., a 5G network), a cable network, a public switched telephone network, or any combination of two or more of such communication networks. Communication network 106 includes one or more communication paths, such as a satellite path, a fibre-optic path, a cable path, a path that supports Internet communications (e.g., IPTV), free-space connections (e.g., for broadcast or other wireless signals), or any other suitable wired or wireless communication path or combination of such paths.

Computing device 102 includes content generator 110 and virality calculation module 112. In some examples, the virality calculation module 112 comprises a historic virality database 114. In some examples, the virality calculation module 112 is in communication with the historic virality database 114. The users provide feedback (118) on a content item 116A-B on the content sharing platform(s) 104, for instance, by way of likes, dislikes, shares, views, comments, or the like, via content sharing platform 104, which in turn provides (118) the content item feedback to virality calculation module 112 via communication network 106. In some examples, user feedback is known as a parameter of a content item. Content generator 110 is used to generate an item of content, which may be user-generated audio, video, audio/video, image content or any other type of content. In some examples, the content item generated by content generator 110 is uploaded to content sharing platform 104 via communication network 106 by a network module 112 for access by one or more other users via computing device(s) 108.

Figure 10:
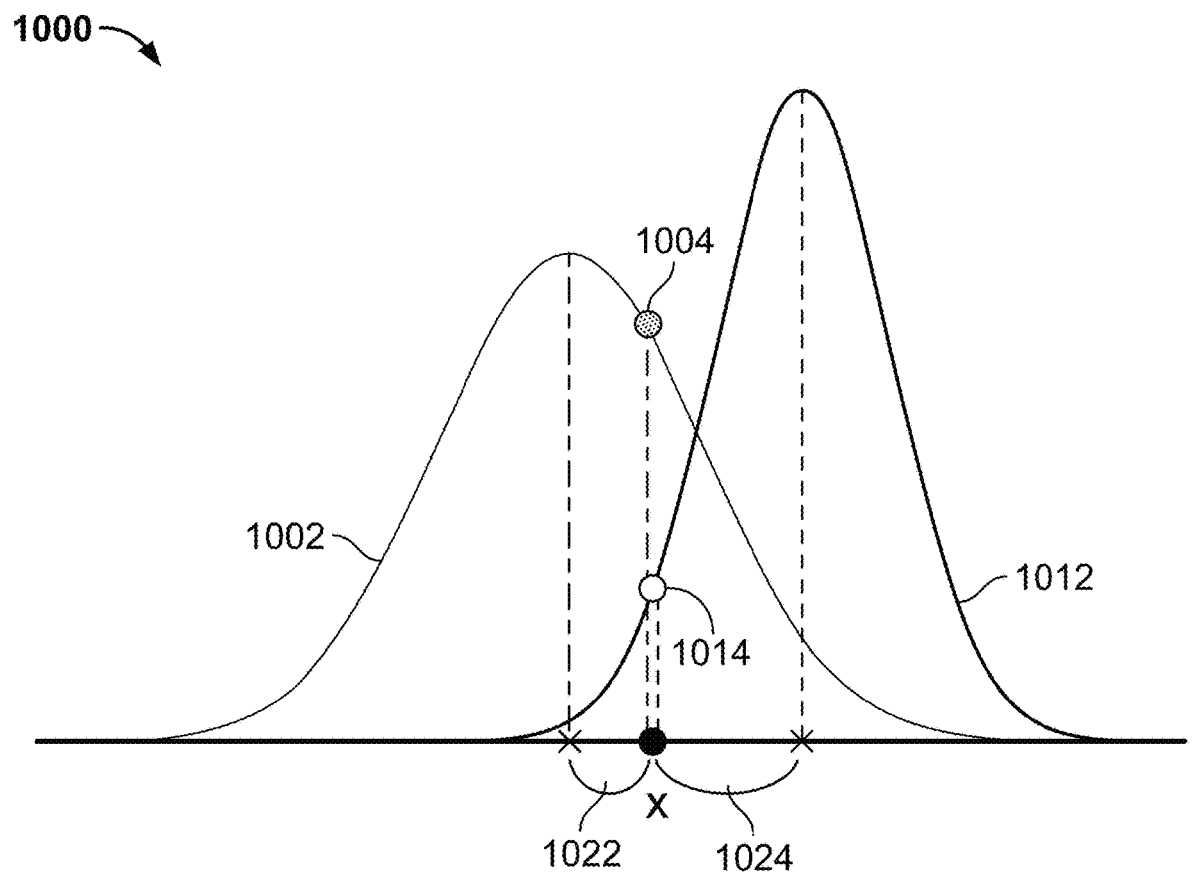
FIG. 10 depicts an exemplary continuous probability distribution of first data and second data, in accordance with some embodiments of the disclosure.

Virality calculation module 112 calculates a virality score for a content item based on the received content item feedback, which is stored in historic virality database 114, and discussed in more detail with regard to FIG. 10. If the calculated virality score fails to meet a virality criterion, which may be user-configured or system-configured, virality calculation module 112 classifies the content item as not likely to be viral and publishes the content item immediately via network module 116. If the calculated virality score meets the virality criterion, virality calculation module 112 classifies the content item as likely to be viral and queues the content item for auto-publishing by the network module 116 at the best time selected and/or calculated by the virality calculation module 112. The network module 116 uploads (120) the content item to content sharing platform 104 via communication network 106 for access by one or more other users via computing devices 108A-B. At this point, in some examples, the feedback, measurement, and the auto-publishing cycle repeat. Additional details regarding the features and functionality of system 100 are provided below.

Although not shown in FIG. 1, each of the content generator 110, virality calculation module 112, historic virality database 114, and network module 116 of the computing device 102 are communicatively coupled to one another as appropriate. Network module 116 may further comprise a transceiver module to send and receive data between the communication network. Computing device 102 may further comprise a control module, comprising one or more processing elements, to instruct one or more of the modules of computing device 102.

Figure 2:
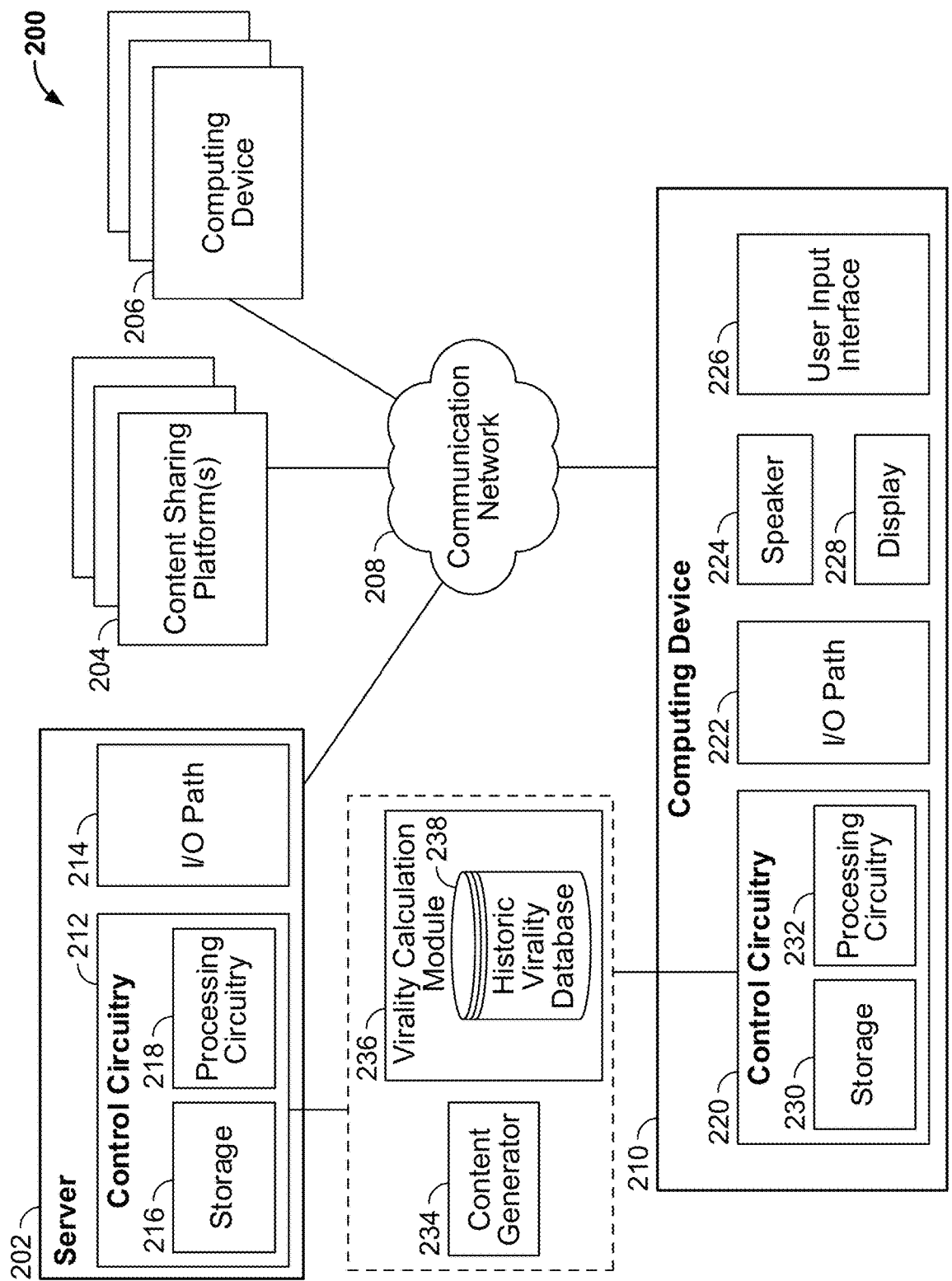
FIG. 2 is an illustrative block diagram showing additional details of the system of FIG. 1, in accordance with some embodiments of the disclosure.

FIG. 2 is an illustrative block diagram showing system 200, which shows additional details of the system 100 of FIG. 1, in accordance with some embodiments of the disclosure. Although FIG. 2 shows certain numbers of components, in various examples, system 200 may include fewer than the illustrated components and/or multiples of one or more illustrated components. System 200 includes server 202, computing device 210, content sharing platform(s) 204, computing device(s) 206, each communicatively coupled to communication network 208, which may be the Internet or any other suitable network or group of networks. In some embodiments, system 200 excludes server 202, and functionality that would otherwise be implemented by server 202 is instead implemented by other components of system 200, such as computing device 210. In still other embodiments, server 202 works in conjunction with computing device 210 to implement certain functionality described herein in a distributed or cooperative manner.

Server 202 includes control circuitry 212 and I/O path 214, and control circuitry 212 includes storage 216 and processing circuitry 218. Computing device 210, which may be a personal computer, a laptop computer, a tablet computer, a smartphone, or any other type of computing device, includes control circuitry 220, I/O path 222, speaker 224, display 228, and user input interface 226. Control circuitry 220 includes storage 230 and processing circuitry 232. Control circuitry 212 and/or 220 may be based on any suitable processing circuitry such as processing circuitry 218 and/or 232. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 212 are configured to implement content generator 234, virality calculation module 236, and/or virality enhancement database 238, which may further represent content generator 110, virality calculation module 112, and historic virality database 114 described above in connection with FIG. 1.

Each of storage 216, storage 230, and/or storages of other components of system 200 (e.g., storages of content sharing platform(s) 204, computing devices 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each of storage 216, storage 230, and/or storages of other components of system 200 may be used to store various types of content, metadata, and or other types of data. The non-volatile memory may also be used (e.g., to launch a boot-up routine and other instructions). Cloud-based storage may be used to supplement storages 216, 230 or instead of storages 216, 230. In some embodiments, control circuitry 212 and/or 220 executes instructions for an application stored in memory (e.g., storage 216 and/or 230). Specifically, control circuitry 212 and/or 220 may be instructed by the application to perform the functions discussed herein. In some implementations, any action performed by control circuitry 212 and/or 220 may be based on instructions received from the application. For example, the application may be implemented as software or a set of executable instructions that may be stored in storage 216 and/or 230 and executed by control circuitry 212 and/or 220. In some embodiments, the application may be a client/server application where only a client application resides on computing device 210, and a server application resides on server 202.

The application may be implemented using any suitable architecture. For example, it may be a stand-alone application wholly implemented on computing device 210. In such an approach, instructions for the application are stored locally (e.g., in storage 230), and data for use by the application is downloaded on a periodic basis (e.g., from an out-of-band feed, from an Internet resource, or using another suitable approach). Control circuitry 220 may retrieve instructions for the application from storage 230 and process the instructions to perform the functionality described herein. Based on the processed instructions, control circuitry 220 may determine what action to perform when input is received from user input interface 226.

In client/server-based embodiments, control circuitry 220 may include communication circuitry suitable for communicating with an application server (e.g., server 202) or other networks or servers. The instructions for carrying out the functionality described herein may be stored on the application server. Communication circuitry may include a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol for communication with other equipment, or any other suitable communication circuitry. Such communication may involve the Internet or any other suitable communication networks or paths (e.g., communication network 208). In another example of a client/server-based application, control circuitry 220 runs a web browser that interprets web pages provided by a remote server (e.g., server 202). For example, the remote server may store the instructions for the application in a storage device. The remote server may process the stored instructions using circuitry (e.g., control circuitry 212) and/or generate displays. Computing device 210 may receive the displays generated by the remote server and may display the content of the displays locally via display 228. This way, the processing of the instructions is performed remotely (e.g., by server 202) while the resulting displays, such as the display windows described elsewhere herein, are provided locally on computing device 210. Computing device 210 may receive inputs from the user via input interface 226 and transmit those inputs to the remote server for processing and generating the corresponding displays.

A user may send instructions (for instance, instructions to generate and/or upload content items to content sharing platform(s) 204 via communication network 208) to control circuitry 212 and/or 220 using user input interface 226. User input interface 226 may be any suitable user interface, such as a remote control, trackball, keypad, keyboard, touchscreen, touchpad, stylus input, joystick, voice recognition interface, a gaming controller, or other user input interfaces. User input interface 226 may be integrated with or combined with display 228, which may be a monitor, a television, a liquid crystal display (LCD), an electronic ink display, or any other equipment suitable for displaying visual images.

Server 202 and computing device 210 may transmit and receive content and data via input/output (hereinafter "I/O") paths 214 and 222, respectively. For instance, I/O path 222 and/or I/O path 214 may include a communication port configured to upload content items to content sharing platform(s) 204 via communication network 208 and receive feedback on content items from computing devices 206 by way of content sharing platform(s) 204 and communication network 208. Control circuitry 212, 220 may be used to send and receive commands, requests, and other suitable data using I/O paths 214, 222. An additional system, which may also implement the embodiments of the present disclosure, is described with reference to FIGS. 15 and 16.

Figure 3:
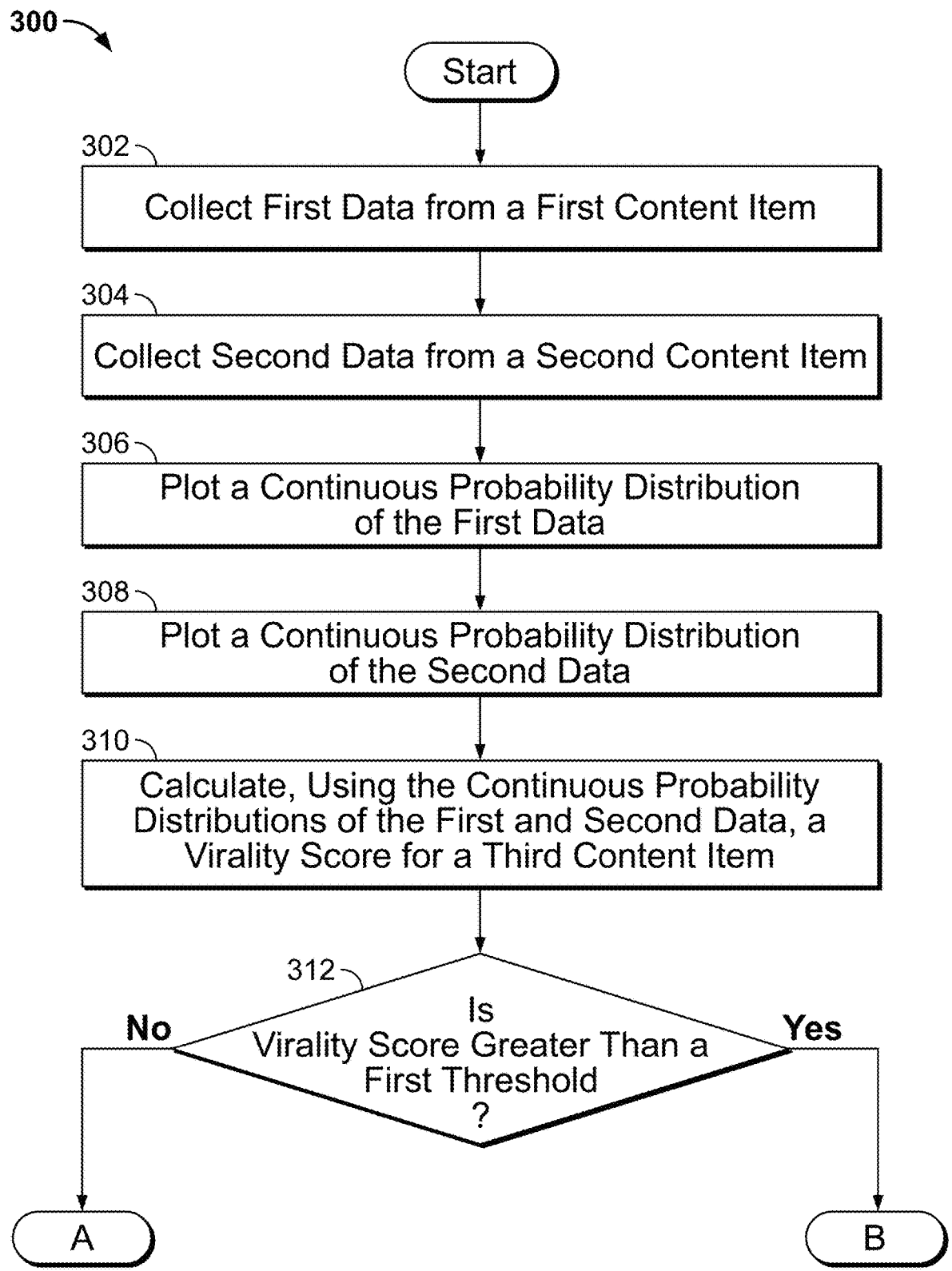
FIG. 3 depicts an illustrative flowchart of a process for calculating a virality score for a content item, in accordance with some embodiments of the disclosure.

Having described systems 100 and 200, reference is now made to FIG. 3, which depicts an illustrative flowchart of process 300 for calculating a virality score for a content item, which may be implemented by using system 100 and/or system 200, in accordance with some embodiments of the disclosure. In various embodiments, individual steps of process 300, or any process described herein, may be implemented by one or more components of system 100 and/or system 200. Although the present disclosure may describe certain steps of process 300 (and of other processes described herein) as being implemented by certain components of system 100 and/or system 200, this is for purposes of illustration only, and it should be understood that other components of system 100 and/or system 200 may implement those steps instead. In addition, as will be described with reference to FIGS. 15 and 16, system 1500 and/or system 1600 may also implement various steps of process 300, or any process described herein.

Process 300 begins at step 302. At step 302, control circuitry 220 collects and/or receives the first data from a first content item. At step 304, control circuitry 220 collects and/or receives second data from a second content item. The first and second data may comprise any one, or more of: a number of likes, a number of dislikes, a number of comments, a number of views, a representation of user engagement, a watch time, a number of shares, an indication of music, an identification of an object, an identification of a place, an identification of people, and identification of an animal, an identification of an action, an identification of writing, an identification of known landmarks, length of the content item, the topic of the content item, or natural language processing data.

In some examples, the first content item is a viral content item, i.e., a piece of content that previously went viral. Viral content is any piece of content, typically online content, that achieves a high level of awareness due to, for example, shares, likes, and exposure on social media networks, news websites, aggregators, email newsletters, search engines, and the like. In some examples, the second content item is not a viral content item.

At step 306, a continuous probability distribution of the first data is plotted. At step 308, a continuous probability distribution of the second data is plotted. Exemplary continuous probability distributions of the first and second data are shown and described with reference to FIG. 10.

A continuous probability distribution is a probability distribution whose support is an uncountable set. They are uniquely characterized by a cumulative distribution function that can be used to calculate the probability for each subset of the support. There are many examples of continuous probability distributions: a normal distribution (i.e., gaussian), uniform, chi-squared, Naïve Bayes, quadratic discriminant analysis, and others.

In some examples, the continuous probability distribution plotted for the first data and second data is a Gaussian Naïve Bayes, which is a variant of Naïve Bayes that follows Gaussian normal distribution and supports continuous data. Naïve Bayes are a group of supervised machine learning classification algorithms based on the Bayes theorem. It is a classification technique but has high functionality. They find use when the dimensionality of the inputs is high. Complex classification problems can also be implemented by using Naïve Bayes Classifier. Reference will be made throughout the application to Gaussian Naïve Bayes however it is considered within the scope of this disclosure for any other suitable replacement or similar continuous probability distribution also. The name "Naïve" is used because it assumes the features that go into the model is independent of each other. That is to say that changing the value of one parameter, does not directly influence or change the value of any of the other parameters used in the algorithm.

At step 310, a virality score for a third content item is calculated using the continuous probability distributions of the first and second data. In some examples, the Bayes theorem can be used to calculate the virality score. It is known that Bayes Theorem can be used to calculate conditional probability. In addition, being a powerful tool in the study of probability, it is may also be applied in Machine Learning, and used to calculate probability and likelihood.

In particular, the virality score is based on the first parameter common to the first and second data, accordingly, the virality score is indirectly based on at least one or more of: a number of likes, a number of dislikes, a number of comments, a number of views, a representation of user engagement, a watch time, a number of shares, an indication of music, an identification of an object, an identification of a place, an identification of people, and identification of an animal, an identification of an action, an identification of writing, an identification of known landmarks, length of the content item, the topic of the content item, or natural language processing data.

Predicting the virality of content before it is published or uploaded to a social network is a challenging task. Social networks attempt to predict whether content will go viral after if it is available for mass consumption based exclusively on insights gained from interaction with the content and then such content items become associated, typically, with a 'trending' category. Some algorithms also predict the popularity of a given content item based on who is sharing the item as well as the number of followers, their followers, etc. Some services offer social media management solutions (e.g., HootSuite) that include features such as automated post scheduling based on a user's social activity and the social activity of their social circle to maximize reach. However, this is simply based on the user's/user's friends' activities and is not effective. Some videos that should go viral or receive more views than they normally end up getting are not shown to enough users due to timing or due to the vast number of uploads that a given social network experiences at any given minute.

When working with continuous data such as the case with the present disclosure, for example, an assumption often taken is that the continuous values associated with each class are distributed according to a normal (or Gaussian) distribution. As will be described in more detail with respect to FIG. 10, a Gaussian Naïve Bayes can be used to determine the probability of a content item being viral.

At step 312, it is determined whether or not the virality score is greater than a first threshold. In some examples, the first threshold may be greater than 50%, which may be interpreted as the third content item is more likely to go viral than not go viral. However, the first threshold may be configured to be higher than 50%, such as 80% or greater, according to the importance of identifying likely viral content to the user. A first threshold, or virality criterion, may be user-configured or system-configured and may be stored in and retrieved from virality calculation module 112 of FIG. 1.

In response to the answer to step 312 being no, process 300 continues may continue on process 400 of FIG. 4A, as will be described in more detail below. In response to the answer to step 312 being yes, process 300 continues to process 450 of FIG. 4B, as will be described in more detail below.

Process 300 may also comprise an additional step of identifying a first parameter common to the first data and second data. In some examples, the process may also comprise calculating a mean value and standard deviation of the first parameter. In some examples, plotting the gaussian distribution of the first data and second data is based on the mean value and standard deviation of the first parameter common to the first data and the second data.

Figure 4A:
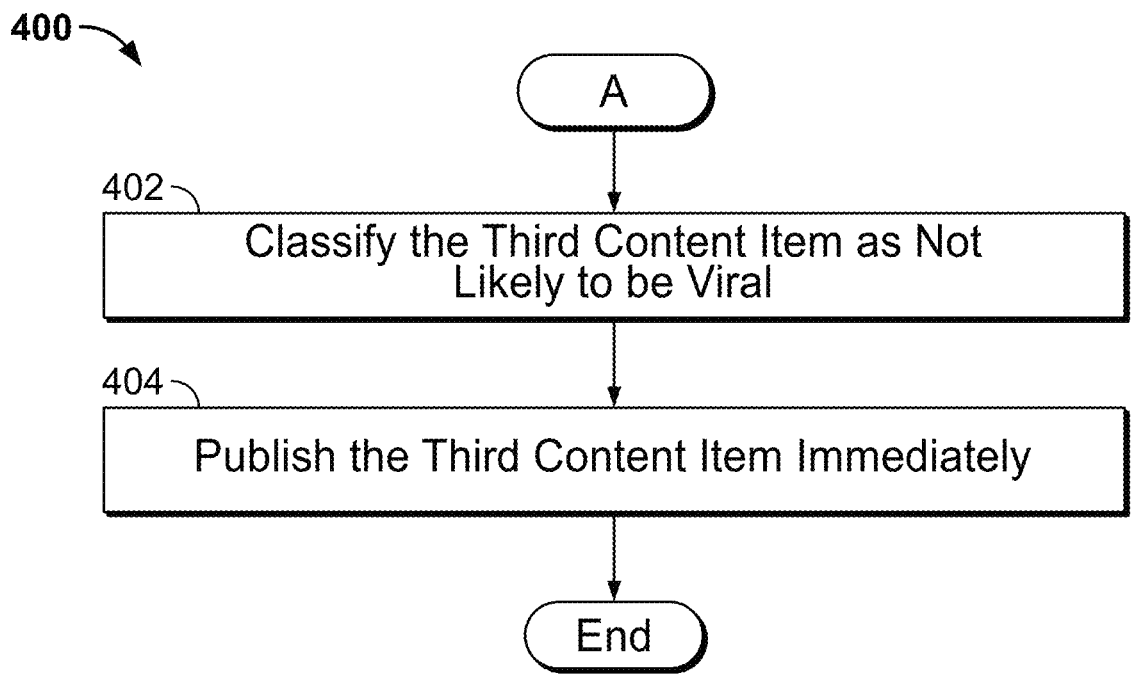
FIGS. 4A & 4B depict illustrative flowcharts of processes for when a virality score is greater than or less than a first threshold, in accordance with some embodiments of the disclosure.
Figure 4B:
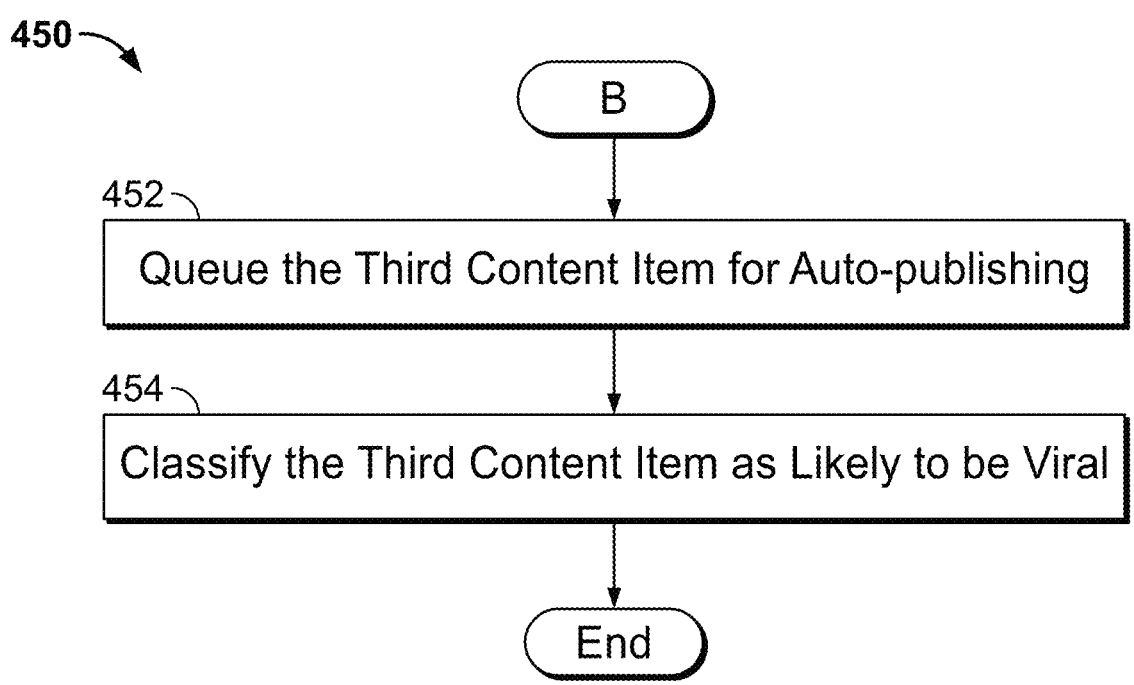

FIGS. 4A & 4B depict illustrative flowcharts of processes for when a virality score is greater than or less than a first threshold, in accordance with some embodiments of the disclosure. As mentioned previously but mentioned here for clarity, in various embodiments, individual steps of processes 400 or 450, or any process described herein, may be implemented by one or more components of the systems described herein. Any one or both of processes 400 or 450 may be carried out after step 312 of process 300.

After determining that the virality score of the third content item is less than a threshold in step 312 of process 300, the system may continue to process 400, which begins at step 402. At step 402, the third content item is classified as not likely to be viral content and/or to go viral. Process 400 may end after step 402. However, as shown in FIG. 4A, it is likely that the user would like to publish the third content item therefore the process 400 may continue to step 404.

At step 404, the third content item is published. In some examples, the third content item may be published immediately without waiting for a specific upload time.

After determining that the virality score of the third content item is greater than a threshold in step 312 of process 300, the system continues to process 450, which begins at step 452. At step 452, the third content item is queued for auto-publishing. Auto-publishing occurs before the time when peak traffic is expected on the media platform of choice for publishing the third content item. For example, many studies have been carried out on when is best to post on social media platforms such as YouTube and TikTok. While results vary based on the target audience of the publisher, it is commonly accepted that content should be uploaded prior to peak viewership so that content items can be tested against idle users and gain traction.

At step 454, the third content item is classified as likely to be viral. In some examples, steps 452 and 454 are reversed or carried out in parallel. Indeed, many steps of all the processes in this disclosure may be carried out in parallel or in a different order to as described herein, which is considered within the scope of this disclosure.

Figure 5:
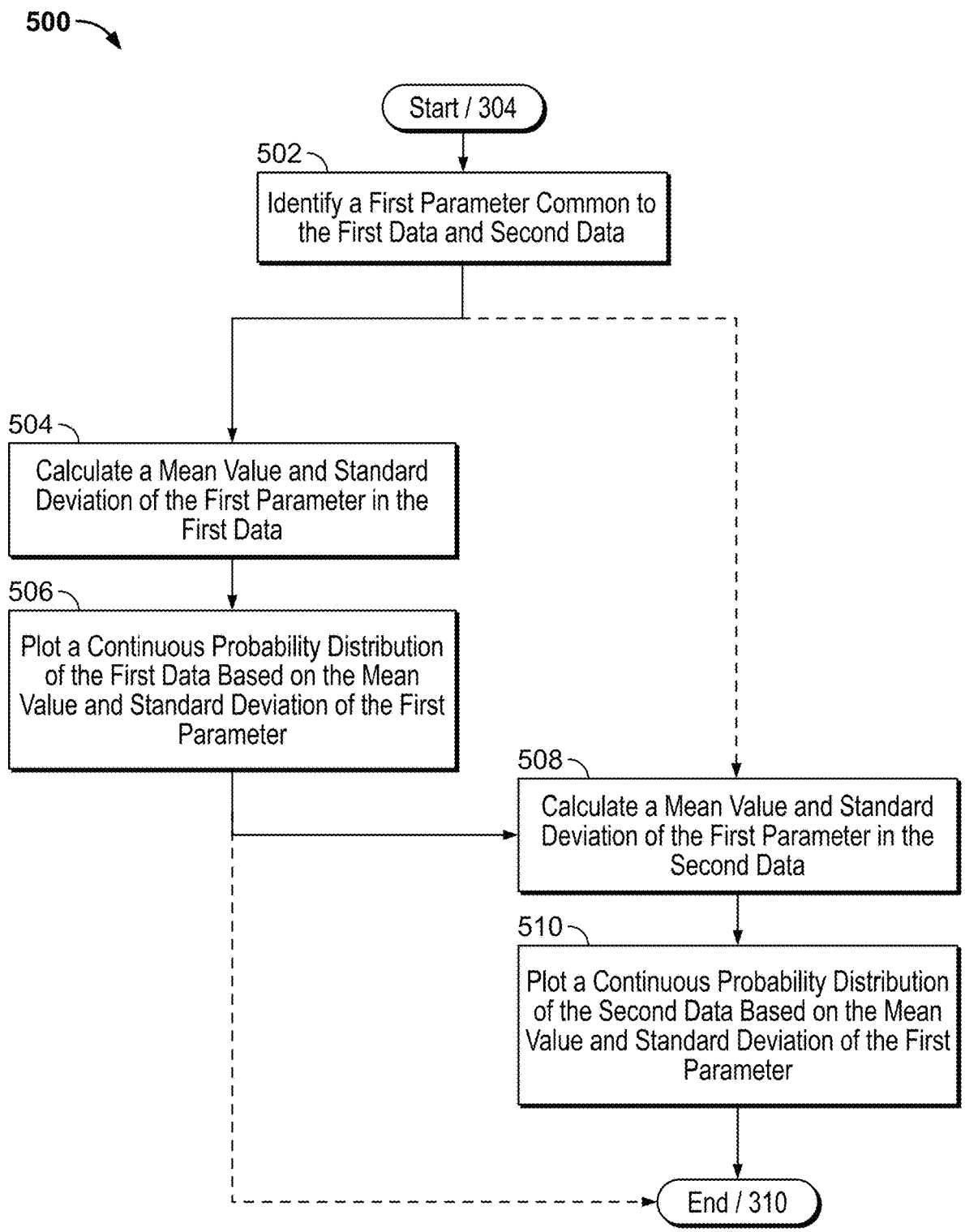
FIG. 5 depicts an illustrative flowchart of a process for plotting a continuous probability distribution if the first parameter for a content item, in accordance with some embodiments of the disclosure.

FIG. 5 depicts an illustrative flowchart of a process for plotting a continuous probability distribution if the first parameter for a content item, in accordance with some embodiments of the disclosure. Individual steps of process 500 may be implemented by one or more components of the systems described herein. Process 500 may be carried out after step 304 and prior to step 310 of process 300. However, process 500 may be carried out independently or parallel to process 300, 400, or 450.

At step 502, a first parameter common to the first data collected from the first content item and second data collected from the second content item is identified. In some examples, the first parameter is one of a number of likes, a number of dislikes, a number of comments, a number of views, a representation of user engagement, a watch time, a number of shares, an indication of music, an identification of an object, an identification of a place, an identification of people, an identification of an animal, an identification of an action, an identification of writing, quality of sound, quality of video, volume of music or audio, or natural language processing data.

In some examples, the first data and second data may both have a common measurable parameter. The common parameter may also be considered a "gene", common to each of the first data and second data, and therefore common to the first content item or second content item. For example, the first parameter may be the identification of a piece of music. This data can be used to train a machine learning model (e.g., Gaussian Naive Bayes) with attributes derived or extracted from such videos—including topic, colour content of the image, influential objects within the video, # of comments the video received, time of upload, time of the first view, etc. It is important to note that the same features (e.g., presence of a puppy) in one video can be assigned different scores based on other available features, context, topic, etc.

As shown in FIG. 5, after step 502, process 500 may continue to step 504 or step 508; this is to illustrate that steps 504, 506, 508 and 510 may benefit from being carried out in parallel. For example, steps 504 and 506 may be carried out in parallel to steps 508 and 510, as illustrated in FIG. 5 by the dashed and solid line from step 502 to step 504 and 508. For the remainder of the description of FIG. 5, process 500 will be described with reference to the solid line for simplicity.

At step 504, a mean value and standard deviation of the first parameter in the first data is calculated. In some examples, the mean value of the first parameter may represent the frequency of occurrence of the first parameter and/or the length of time occurrence of the first parameter in the second data. The standard deviation of the first parameter is a quantity expressing by how much the members of a group differ from the mean value for the group.

At step 506, a continuous probability distribution of the first data based on the mean value and standard deviation of the first parameter is plotted. The continuous probability distribution is one such as that described with reference to FIG. 10 below. As described above with reference to FIG. 3 a continuous probability distribution is a probability distribution whose support is an uncountable set. They are uniquely characterized by a cumulative distribution function that can be used to calculate the probability for each subset of the support. There are many examples of continuous probability distributions: a normal distribution (i.e., gaussian), uniform, chi-squared, Naïve Bayes, and others.

At step 508, similar to step 504, a mean value and standard deviation of the first parameter in the second data is calculated. In some examples, the mean value of the first parameter may represent the frequency of occurrence of the first parameter and/or the length of time occurrence of the first parameter in the second data. The standard deviation of the first parameter is a quantity expressing by how much the members of a group differ from the mean value for the group.

At step 510, similar to step 506, a continuous probability distribution of the first data based on the mean value and standard deviation of the first parameter is plotted. The continuous probability distribution is one such as that described with reference to FIG. 10 below. As described above with reference to FIG. 3 a continuous probability distribution is a probability distribution whose support is an uncountable set. They are uniquely characterized by a cumulative distribution function that can be used to calculate the probability for each subset of the support. There are many examples of continuous probability distributions: a normal distribution (i.e., gaussian), uniform, chi-squared, Naïve Bayes, and others.

After step 510, or indeed after steps 506 and 510 (due to the steps above being carried out in parallel) the process 500 may end, or, continue to step 310 of process 300, as described above.

Figure 6:
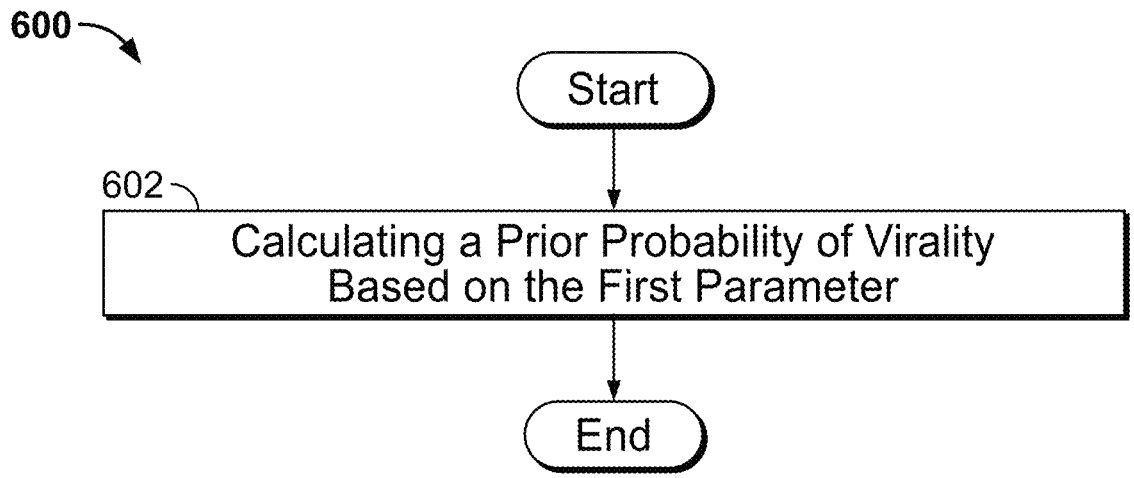
FIGS. 6, 7 and 8 depict illustrative flowcharts of an additional optional process for calculating a virality score for a content item, in accordance with some embodiments of the disclosure.
Figure 7:
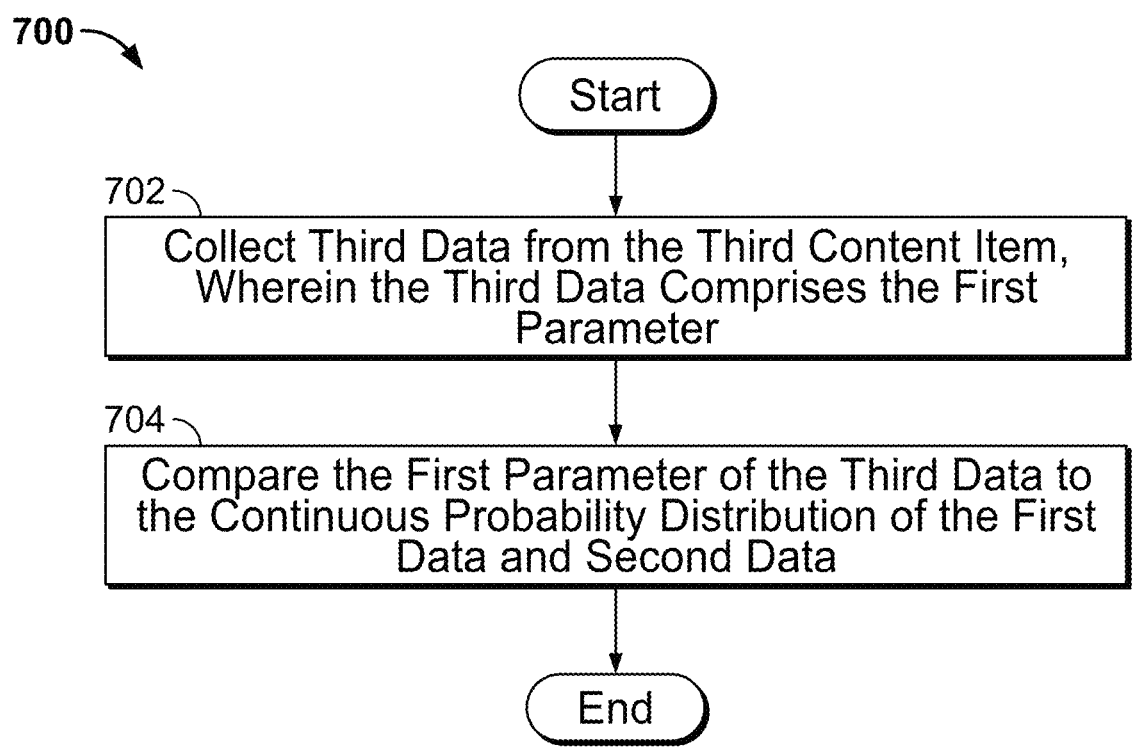
Figures 8, 9:
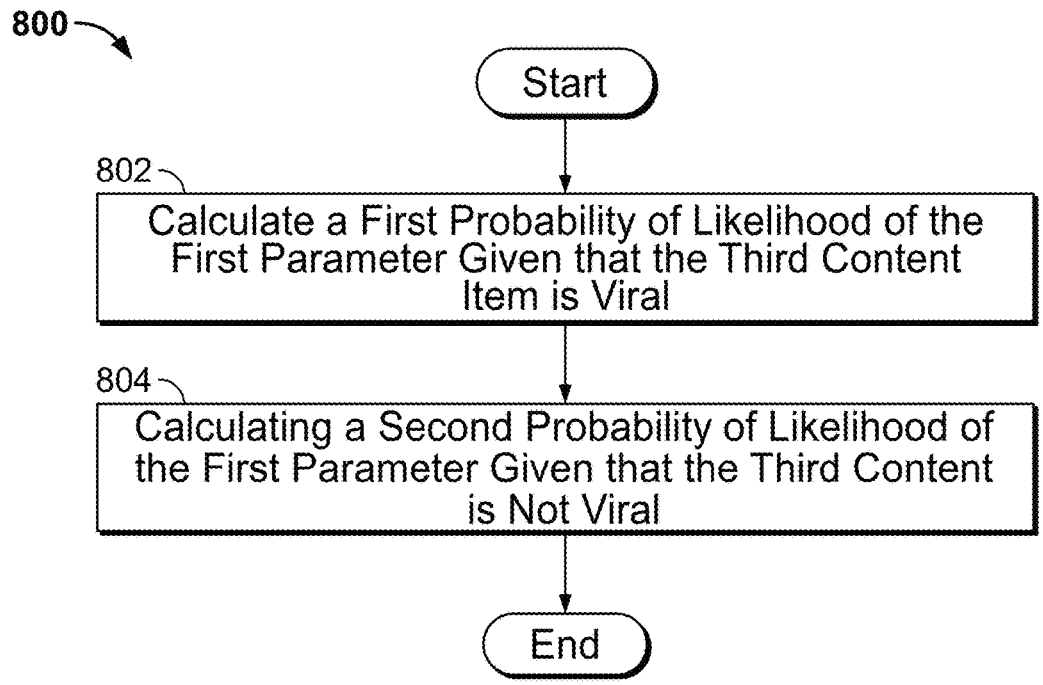
FIG. 9 depicts an example data structure for virality factor database entries and exemplary weighting, in accordance with some embodiments of the disclosure.

FIGS. 6, 7 and 8 depict illustrative flowcharts of an additional optional process for calculating a virality score for a content item, in accordance with some embodiments of the disclosure. FIG. 6 depicts process 600, which comprises step 602. At step 602, a prior probability of viral-based on the first parameter is calculated. That is the proportion of viral content and non-viral content comprising the first parameter out of all the known content items comprising the first parameter. Prior probabilities can be determined independently from the other processes described in the present disclosure. In some examples, the prior probabilities are updated regularly (i.e., before any virality score) or on a scheduled basis (i.e., daily or weekly), or the like. In some examples, the prior probabilities can be computed from training data, data scraped from the content platform(s), or prior content items uploaded by the user and/or system.

FIG. 7 depicts process 700, which starts at step 702. At step 702, third data from the third content item is collected, wherein the third data comprises the first parameter. At step 704, the first parameter of the third data is compared to the continuous probability distribution of the first data and second data. In some examples, the comparison of the first parameter of the third data to the continuous probability distribution of the first data and second data comprises the steps of process 800 shown in FIG. 8.

FIG. 8 depicts process 800, which starts at step 802. At step 802, a first probability of likelihood of the first parameter given that the third content item is viral is calculated. At step 804, a second probability of likelihood of the first parameter given that the third content is not viral is calculated.

By way of example, a guess is made that the third parameter is going to be viral and an appropriate virality score is calculated. In addition, a guess is made that the third parameter is not going to be viral and an appropriate virality score is calculated. Thereafter, the two calculated virality scores are compared and the greatest of the two is accepted. For instance, if the larger virality score is for the guess relating to the content item is not viral, then that score is accepted and the third content item is classified as such. A worked example is given with reference to FIG. 10.

FIG. 9 depicts an example data structure 900 for virality factor database entries and exemplary weighting, in accordance with some embodiments of the disclosure. Each database entry 900 corresponds to a content item and includes a virality factor or content "gene" 902, a number of instances of the virality factor included in the content item 904, a weight for the virality factor 906, and a weighted virality factor 908, which is determined by multiplying the number of instances of the virality factor in the content item 904 by the weight for the virality factor 906. A virality score may be computed using the information in data structure 900 as a weighted combination of the weighted virality factors 908 computed for the content item.

Example types of virality factors or content "genes" include, but are not limited to: a filter, such as a SNAPCHAT filter; a genre; the number of views; number of likes; and/or embedding apt, contextual background music, such as current popular music; speed variations, or changes in frames per second; elements of surprise; and the like. For example, a formal company video-conferencing live meeting may be modified to show an infant suddenly crawling into the video frame as an element of surprise to render the audience awestruck.

As another example, a photo of someone's birthday party may be modified to show the presence of a famous and popular celebrity. As yet another example, a filter, such as a beauty filter, a filter that changes looks into funny faces, or the like, may be applied to the content item to introduce a surprise factor that further mesmerizes the audience and improves virality. Alternatively, or in addition, a combination of currently trending (i.e., viral) genres may be incorporated into the content item to entice the audience and improve virality, retaining the suspense and thrill quotient. For instance, a comedy content item may be modified by introducing into the item portions of content from other genres, such as having a sequence of portions of the content item proceed from a comedy genre to a romance genre to an action genre to a comedy genre to a thriller genre to a comedy genre. As still another example, speed variation may be introduced into the content item, such as by combining slow and normal or fast motion (e.g., in frames per second) based on whether a situation in the displayed content is expected to impact the audience's fondness of the content. For instance, a scene in an old movie in which two lovers meet after ten years may be modified to have a mix of slow and normal motion to increase the surprise and suspense element and use that to captivate the audience.

By way of example, considering Line 910 of FIG. 9, a first parameter may be identified in the data of a first content item that was previously viral, such as embedded background music. There may be P instances of this embedded background music, and table 900 (which may be based on historical data) indicates that embedded background music has a relative weighting (relative to the other factors) of 2. Accordingly, the weighted virality factor of the embedded background music is 2P. The first parameter (in this case embedded background music) may also be present in a second content item that was not viral. The first parameter may also be present in a third content item that the virality of which is to be calculated.

Information and metadata about many viral content items (e.g., already went viral) may be collected and used to update the database 900 of FIG. 9 with additional metadata as more content becomes viral or exceeds a virality score. In essence, "genes" or factors are assigned to the content item and those genes are used to determine the potential virality score of an additional user-generated content item. In some examples, such data is collected via scraping social networks, or even by using APIs provided by a social network (e.g., Facebook, TikTok, Twitter, or the like), or OTT providers; to retrieve videos that meet a specific criterion (e.g., number of views, shared a number of times, a number of likes, etc.) The criterion for determining virality is arbitrary, and is user-configurable (e.g., over 2 million views, 50 thousand likes, etc.). In some examples, a different criterion for virality can be used for each source of video content information, such as a higher threshold for YouTube videos compared to Facebook Videos.

The data collected and used to generated and/or update database 900 can be used to train a machine learning model (e.g., Gaussian Naïve Bayes) with the virality factors (i.e., genes) derived or extracted from such videos—including topic, color content of the image, influential objects within the video, number of comments the video received, time of upload, time of the first view, and the like as described herein. In some examples, the same virality factors (e.g., presence of a puppy) in one video can be assigned a different weighting based on the presence of other factors, such as context, topic, or the like to maintain the independence of the factors in the continuous probability distribution (such as a Gaussian Naïve Bayes classifier, for example).

FIG. 10 depicts an exemplary continuous probability distribution 1000 of first data 1002 and second data 1012, in accordance with some embodiments of the disclosure. In particular, a continuous probability distribution 1000 of a first parameter, for example, embedded background music, in the first data 1002 and second data 1012. FIG. 10 illustrates how a continuous probability can be used to calculate the likelihood of virality of a content item. In essence, the approach takes each data point, such as data points 1004 and 1014, and assigns it to whichever class it is nearest to. However, rather than calculating that nearness by using Euclidean distance from the class means, the present disclosure takes into account not only the distance from the mean but also how this compares to the class variance.

As shown in FIG. 10, the z-score distance 1022 and 1024 for a data point X is calculated. The z-score is the distance of the data point X from the mean, divided by the standard deviation. Therefore, the equation for the z-score is $z_1=(x-\mu_1)/\sigma_1$, where $\rho_1$ is the mean for first data, $\alpha_1$ is the standard deviation of the first data, and $z_1$ is the z-score 1022 for the first data. The z-score calculation is repeated for the second data, to obtain a z-score 1024.

As mentioned before, in some examples, when using a continuous probability distribution, the assumption is made that the classes (the distributions) have Gaussian normal distributions. This is important in calculating the P-values 1004 and 1014. The P-value is the probability of observing a given data point, X, which represents the third data in FIG. 10, if X were drawn from the distribution of a particular class. In other words, if we obtained the P-value this way, we obtain the probability of the data given a particular class (e.g., virality). However, it is more desirable to obtain the probability of a class (e.g., virality), given the data point X (e.g., the third data from the third content item); to accurately predict virality for a content item. Thus, in some examples, it is desirable to use the Bayes theorem applied to a Gaussian continuous probability distribution, which is encompassed in the Gaussian Naïve Bayes.

Within the Gaussian Naïve Bayes algorithms, a "prior probability" is to be calculated in the first instance. The prior probability is the number of viral content with the first parameter and the number of non-viral content with the first parameter out of the total number of content. In other words, it is the label given to the proportion of each class (e.g., viral or non-viral) that have the first parameter collected from historical data, hence, the name "prior probability".

After using the Gaussian Naïve Bayes algorithms, the virality score can therefore be calculated by calculating the probability of X given that it is viral, and the probability of X given that it is not viral. One or more of the following formulae may be used:

$$P(X \mid \text{viral}) =$$

$$\frac{p(\text{viral} \mid X) * P(X)}{P(\text{viral})} = \frac{P(\text{viral} \mid X) * P(X)}{P(\text{viral} \mid X) * P(X) + P(\text{viral} \mid X') * P(X')}$$

$$P(x \mid \text{viral}) = \frac{1}{\sqrt{2\pi\sigma_{viral}^2}} \exp\left(-\frac{(x - \mu_{viral})^2}{2\sigma_{viral}^2}\right)$$

$$P(X \mid \text{not viral}) = \ldots = \frac{P(\text{not viral} \mid X) * P(X)}{P(\text{not viral} \mid X) * P(X) + P(\text{not viral} \mid X') * P(X')}$$

$$P(x \mid \text{not viral}) = \frac{1}{\sqrt{2\pi\sigma_{not\ viral}^2}} \exp\left(-\frac{(x - \mu_{not\ viral})^2}{2\sigma_{not\ viral}^2}\right)$$

It should be noted that multiplying a large number of small P-values together leads to computer rounding errors (i.e., the underflow problem). Accordingly, it is often necessary to calculate the log probabilities and add the log probabilities together, which is equivalent to multiplying the above-calculated probabilities.

One advantage of the Gaussian Naïve Bayes applied in this way is that the algorithm treats all of the input dimensions as independent, even if there is the covariance between two or more input factors or parameters, Gaussian Naïve Bayes does not model it. In addition, since such a method is a probabilistic model, the processing required is minimal relative to the accuracy of the prediction and are very quick, so much so that such calculations can be performed in real-time. These attributes make the method easily scalable and traditionally the algorithm of choice for real-world applications (apps) that are required to respond to user's requests instantaneously.

In some examples, there may be no first parameter in one of the viral or non-viral data sets. In such a case, the entire probability will become zero because one of the feature's values was zero. To avoid this, in some examples, a count of the variable with a zero value can be assigned a small value (usually 1), so that the overall probability doesn't become zero. Accordingly, in some examples, the method further comprises a 'Laplace Correction' to the continuous probability distribution. Most Naive Bayes model implementations accept this or an equivalent form of correction as a parameter due to the lack of covariance in the model.

These methods are applied to the third content item to be uploaded to a media platform upon selection and/or indication by a user. Thereafter the system will, if the virality score reaches the first threshold, automatically upload the content item to the media platform. In some examples, the first threshold is met when the likelihood of virality as discussed above is greater than the likelihood of the third content item not going viral.

In some examples, a content item is uploaded to a media platform and queued for auto-publishing, in response to the virality score meeting a threshold. The auto-publishing algorithm may also determine the time at which to publish the video, as described above. However, in addition, the auto-publishing algorithm may also determine which users of the media platform to first publish the content item too (e.g., based on the video's category) and based on the member's social score (e.g., number of followers, historical sharing activity, etc.) in order to improve the chances of the video going viral or in order to garner as many views as possible. In some examples, the auto-publishing service queues videos that have the potential of going viral based on various criteria and a virality score. In some examples, the auto-publishing service utilizes real-time insights into the traffic of the media platforms to determine the best time to publish the video. The uploaded videos go through at least one stage of processing to determine whether they should be queued for later publication based on their virality score.

To improve the model, historical data on content items that received a lot of views (e.g., 2M+) can be analyzed and scored based on what caused the video to be popular among users. In some examples, the analysis and scoring can also be carried out which groups of users (e.g., teens, adults, male, female, transgender, pet owners, etc.). That is to say that the first parameter, or indeed a second additional parameter, may also be the groups of users as well. In some examples, content items can be scheduled for auto-publishing at times when a related topic is trending on the media platform (e.g., a social network) or when it is detected that the group of users of interest are active on any given platform.

In addition, to improve the model, in some examples, there may be provided a template based on the historic data to be used by the user when creating the user generated content (content item) in the first instance. For example, when recording the video the system may also provide information about certain things to include in the video, for a given topic, to improve the likelihood of virality based on the chosen. By way of example, if the user is making a video about a hiking trail in the Yosemite mountain range, the system may suggest to include some footage of the "dawn wall" (a wall of El Captian in the Yosemite mountain range) based on interest around the "dawn wall" film released on Netflix that is currently going viral. In this way, the user's target audience may then be targeted towards those with an interesting in climbing, free climbing, solo climbing, bouldering or the like.

Moreover, to improve the likelihood of virality the auto-publishing service may modify the content item to make it compatible with various platforms. For example, the system may extract short clips (e.g., around 10 seconds) from the content item based on the virality score of the content item (i.e., minutes or longer) in order to upload to a service such as TikTok, Instagram reels, or other short video formats and platforms.

Figure 11:
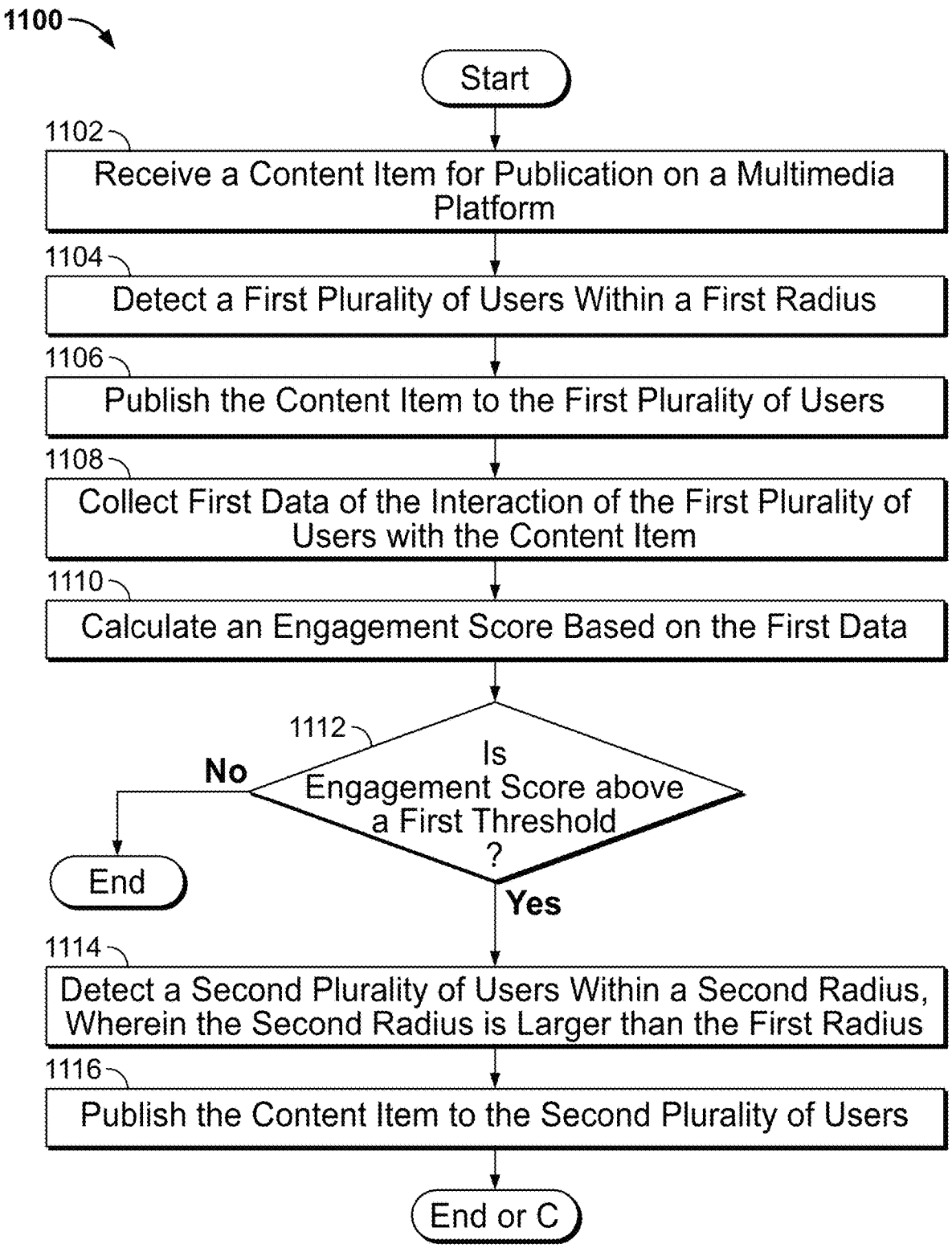
FIG. 11 depicts an illustrative flowchart of a process for publishing content to a plurality of users, in accordance with some embodiments of the disclosure.

FIG. 11 depicts an illustrative flowchart of a process for publishing content to a plurality of users, in accordance with some embodiments of the disclosure. Process 1100 begins at step 1102. At step 1102, a content item is received for publication on a multimedia platform. The content item may be a video, music, text, or the like.

At step 1104, a first plurality of users within a first radius is detected. In some examples, the centre point of the radius is based on a location associated with the content item. For example, a production company that is uploading the content, or an independent content creator, may be located in London, UK, so the first radius will be centred at that point. In some examples, the first plurality of users are idle users. An idle user is an individual who is engaged in an application, but not actively so (e.g., watching the next recommended video but not actively choosing the next video).

At step 1106, the content item is published to the first plurality of users. At step 1108, first data of the interaction of the first plurality of users with the content item is collected. For example, a content item is published to an idle user within a first radius then the user's engagement with the content item is monitored and collected. Thereafter, as described in step 1110, an engagement score based on the first data is calculated. The first data used to calculate the engagement score may comprise a number of likes, a number of dislikes, a number of comments, a number of views, a representation of user engagement, a watch time, a number of shares, an indication of music, an identification of an object, an identification of a place, an identification of people, and identification of an animal, an identification of an action, an identification of writing, an identification of known landmarks, length of the content item, the topic of the content item, or natural language processing data.

In some examples, the engagement score is an indication of the percentage of the first plurality of user's that engaged with the content item. At step 1112, it is determined whether the engagement score is above a first threshold. For example, the engagement score may be above 80%, that is to say, that 80% or more user's engaged positively with the content item. In some examples, the engagement score may be an accumulation of one or more of the first data monitored (e.g., watch time), and the threshold is a minimum amount of engagement (e.g., the minimum number of minutes watched).

In response to the answer to step 1112 being no, process 1100 ends. In response to the answer to step 1112 being yes, process 1100 continues on to step 1114. At step 1114, a second plurality of users within a second radius, wherein the second radius is larger than the first radius is detected. In some examples, the second radius is concentric with the first radius. In some examples, the second radius is not concentric with the first radius. In some examples, the second radius does not overlap with the first radius. In some examples, the second plurality of users may also be within the first radius and not selected in the first plurality. At step 1116, the content item is published to the second plurality of users.

By way of example, in one embodiment a set of idle users is identified located within the first radius of a location, location A. Location A may be the location the content was recorded or the location where the content uploader resides or the production house. A content item is published to K idle users and then the system waits for the impression and feedback from the users (e.g., engagement). In this particular example, engagement is considered when the user spends a minimum time consuming the content item uploaded content. In this particular example, known as the local proliferation example, if 80% of the users crossed the minimum required time spent consuming the content item, the second plurality of users within a second radius, concentric and larger than the first radius, are detected and the content item is published to the second plurality of users.

In an additional example, to preserve the diversity of users to whom content is shared (i.e., those beyond the geographical location proliferation example above), there is an example referred to as "diversity-based proliferation". By way of example, a user in Kenya might like the content published in Pakistan. In this particular example, the initial selection of users is as described above, regarding the local proliferation of the publication of the content item, i.e., a user with an interest in the content item (e.g., a genre, topic, language type, content of the content item, or the like) is chosen. However, due to the larger radius likely to be needed to identify a first plurality of users between Kenya and Pakistan, a higher engagement threshold is set, (e.g., greater than 95% for each country or locale).

In this way, publishing content after a threshold engagement is made also protects the spread of misinformation or so-called "fake news", as well as graphic, violent or content that is not appropriately labelled (such as items marked "PG: Parental Guidance" but has strong language), as the content item isn't further published until user engagement with the first plurality of users reaches a threshold.

In some examples, for both the local and diversity proliferation method, the publication algorithm is repeated in each respective region by expanding the geo-filter at an exponentially increasing radius (a larger walk) based on the user engagement score (e.g., impression and feedback). In some examples, a feedback/impression is a metric calculated from watch time duration, the likes and dislikes, sentiments obtained from comments, etc; wherein each feedback/impression is weighted differently to the other, as described with reference to FIG. 9 and the viral factors.

In some examples, the minimum required watch time could be as low as 10% of the total content duration to be counted as an engagement, such a low barrier to record an engagement would publish the content to more users at a faster rate. Based on the different rates of expansion due to the higher engagement requirement of the diversity proliferation, the diversity-based proliferation will cover a larger radius, but likely publish content at a slower rate. On the other hand, the local proliferation method would have a smaller first radius, but that first radius would likely grow at a much faster rate.

In some examples, a preliminary assumption is that the user who is uploading the content is associated with the content. In some examples, If a user did not attempt to watch the content, a new candidate user to compensate the initial set is required.

Figure 12A:
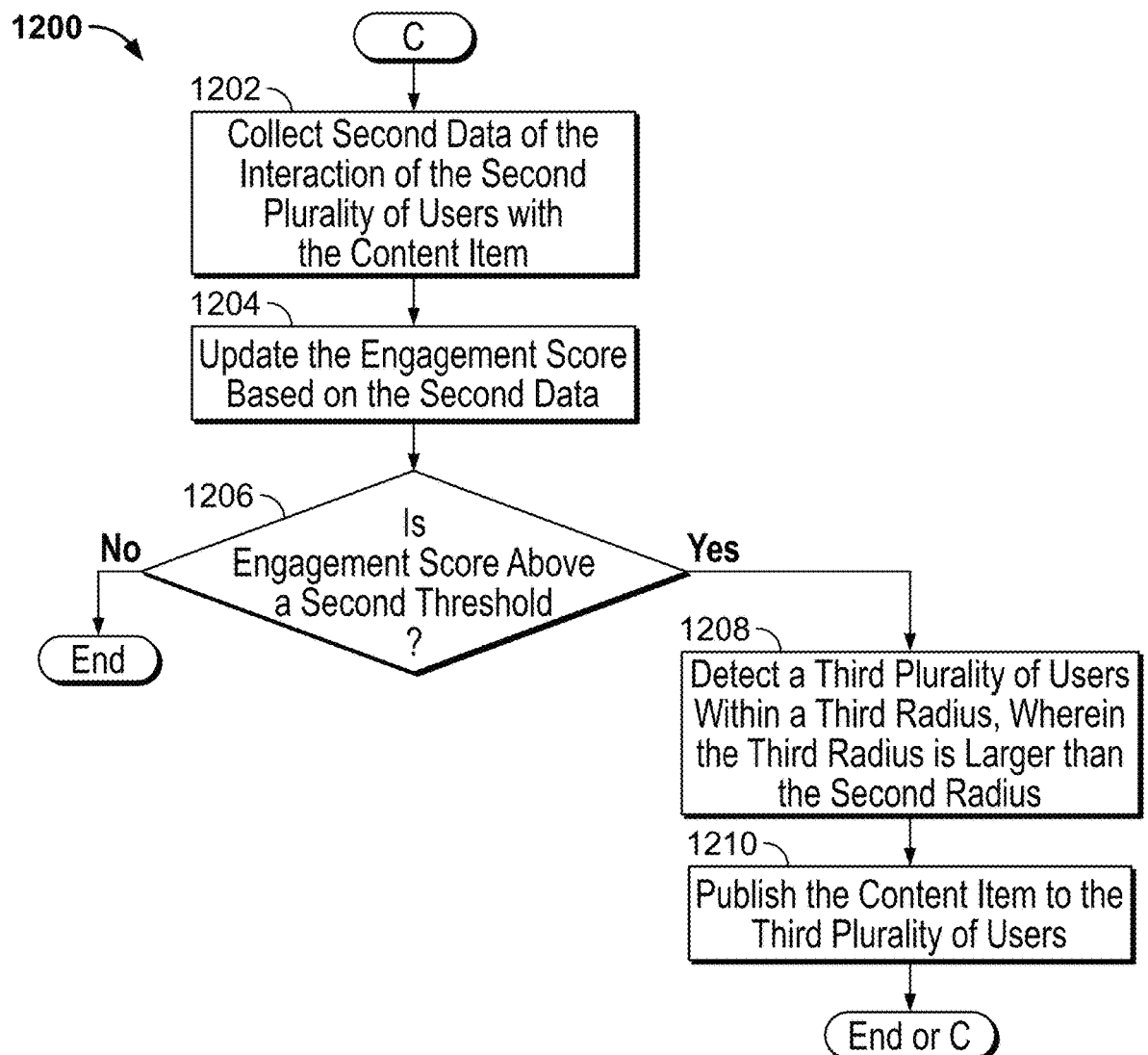
FIGS. 12A and 12B depict illustrative flowcharts of optional processes for publishing content to a plurality of users, in accordance with some embodiments of the disclosure.
Figure 12B:
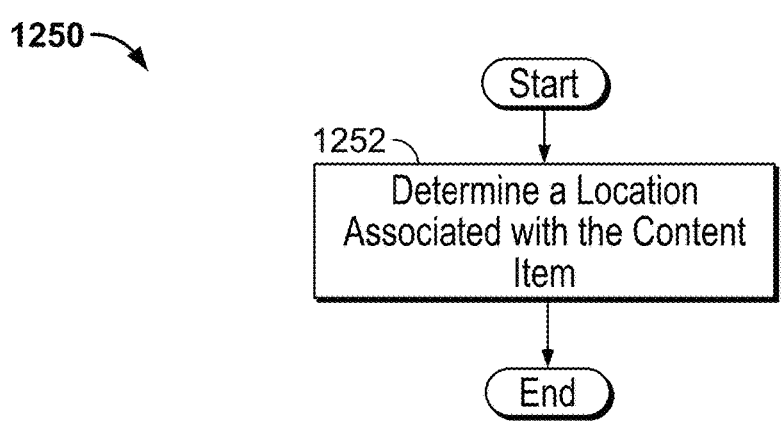

After step 1116, process 1100 either ends or proceeds to step 1202 of process 1200. FIGS. 12A and 12B depict illustrative flowcharts of optional processes for publishing content to a plurality of users, in accordance with some embodiments of the disclosure. FIGS. 12A and 12B are optional extensions of the steps of process 1100 described with reference to FIG. 11, accordingly the description above is considered included within the described of FIGS. 12A and 12B.

At step 1202, second data of the interaction of the second plurality of users with the content item is collected. At step 1204, the engagement score is updated based on the second data. At step 1206, it is determined whether or not the engagement score is above a second threshold.

If the answer to step 1206 is no, process 1200 ends. If the answer to step 1206 is yes, process 1200 continues on to steps 1208 and 1210. At step 1208, a third plurality of users within a third radius are detected. In some examples, the third radius is larger than the second radius. At step 1210, the content item is published to the third plurality of users.

In addition, FIG. 12B shows an optional step that can be inserted into process 1100, as described with reference to FIG. 11. At step 1252 of process 1250, a location associated with the content item is determined. In some examples, the location is determined by at least one of receiving an indication of the location from the user, detecting location metadata, or via a GPS.

Figure 13A:
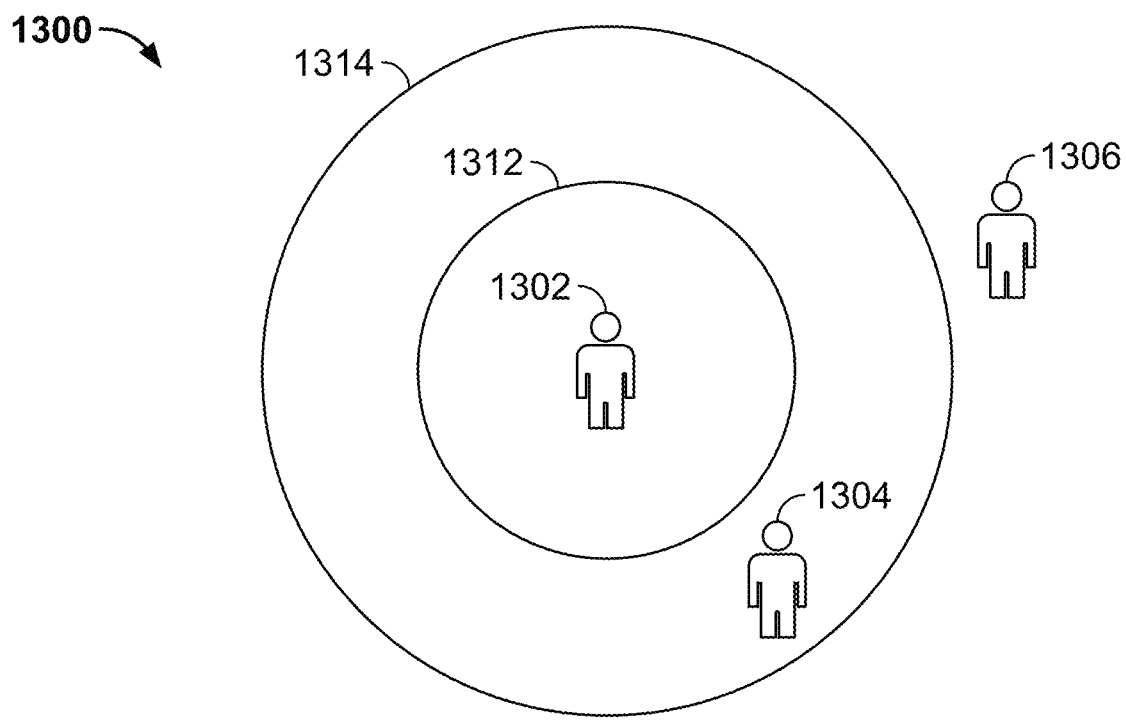
FIGS. 13A and 13B illustrate exemplary radii comprising a plurality of users, in accordance with some embodiments of the disclosure.
Figure 13B:
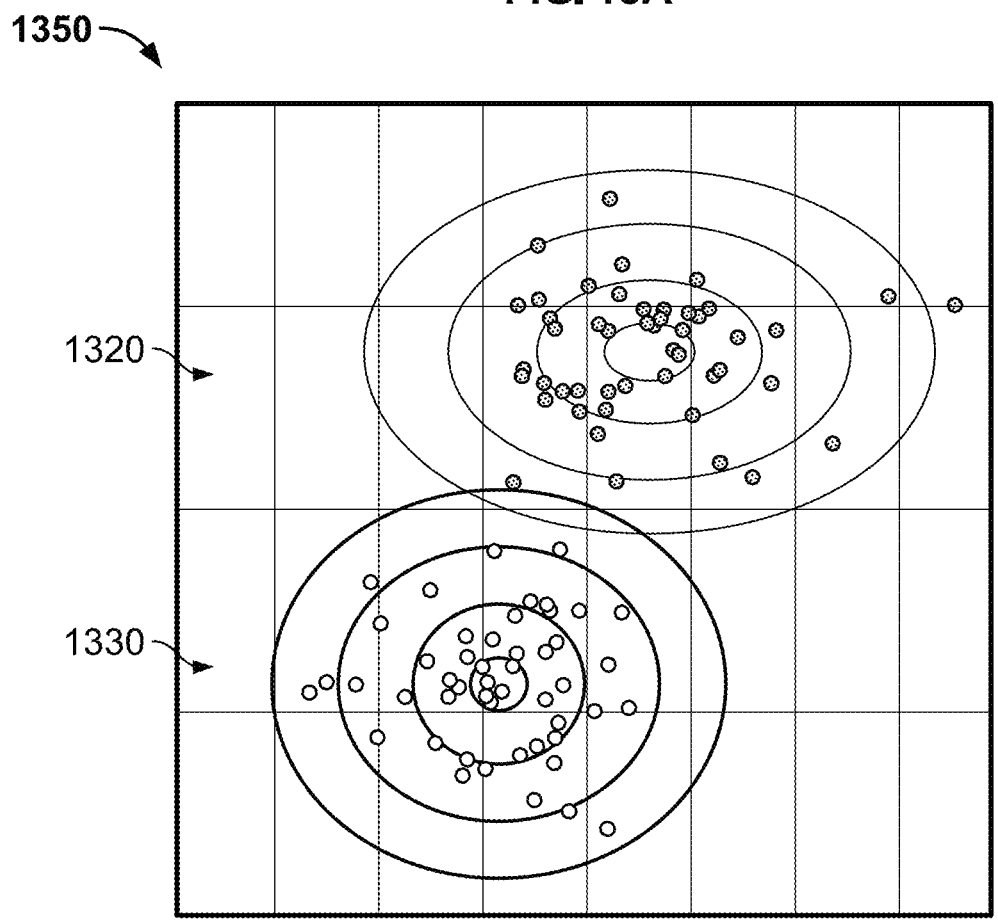

FIGS. 13A and 13B illustrate exemplary radii comprising a plurality of users, in accordance with some embodiments of the disclosure. As shown in FIG. 13A, exemplary radii 1300 comprise a plurality of users 1302, 1304, 1306, and a first radius 1312 and second radius 1314. As described with reference to FIGS. 11, 12A, and 12B, the first plurality of users 1302 are identified within a first radius 1312 and a content item is published to those users. At this stage, the second plurality of users 1304, are not inside the first radius 1312 and therefore do not receive the content item.

After it is determined that the engagement score has reached the first threshold, the second plurality of users 1304 is identified within a second radius 1314, which is greater than the first radius (also shown to be concentric with the first radius in FIG. 13A). At this stage, the third plurality of users are not within the first or second radii and therefore do not receive the published content item. The radii in FIG. 13A are considered the first instance of publication.

In some examples, more than one instance of publication is made, as shown in FIG. 13B. FIG. 13B shows a plurality of radii 1350, in particular, there is shown the first instance of publication 1320 and second instance of publication 1330. The first instance of publication 1320 can be considered the same as that described with reference to FIG. 13A.

The "pips" in FIG. 13B are representations of users, and the graph shows a heat map of users within the radii. In some examples, as shown in FIG. 13B, the radii of the first instance of publication 1320 and the second instance of publication 1330 may overlap. In this way, the radii may combine and the first and second instances of publication 1320 and 1330 become one.

Figure 14:
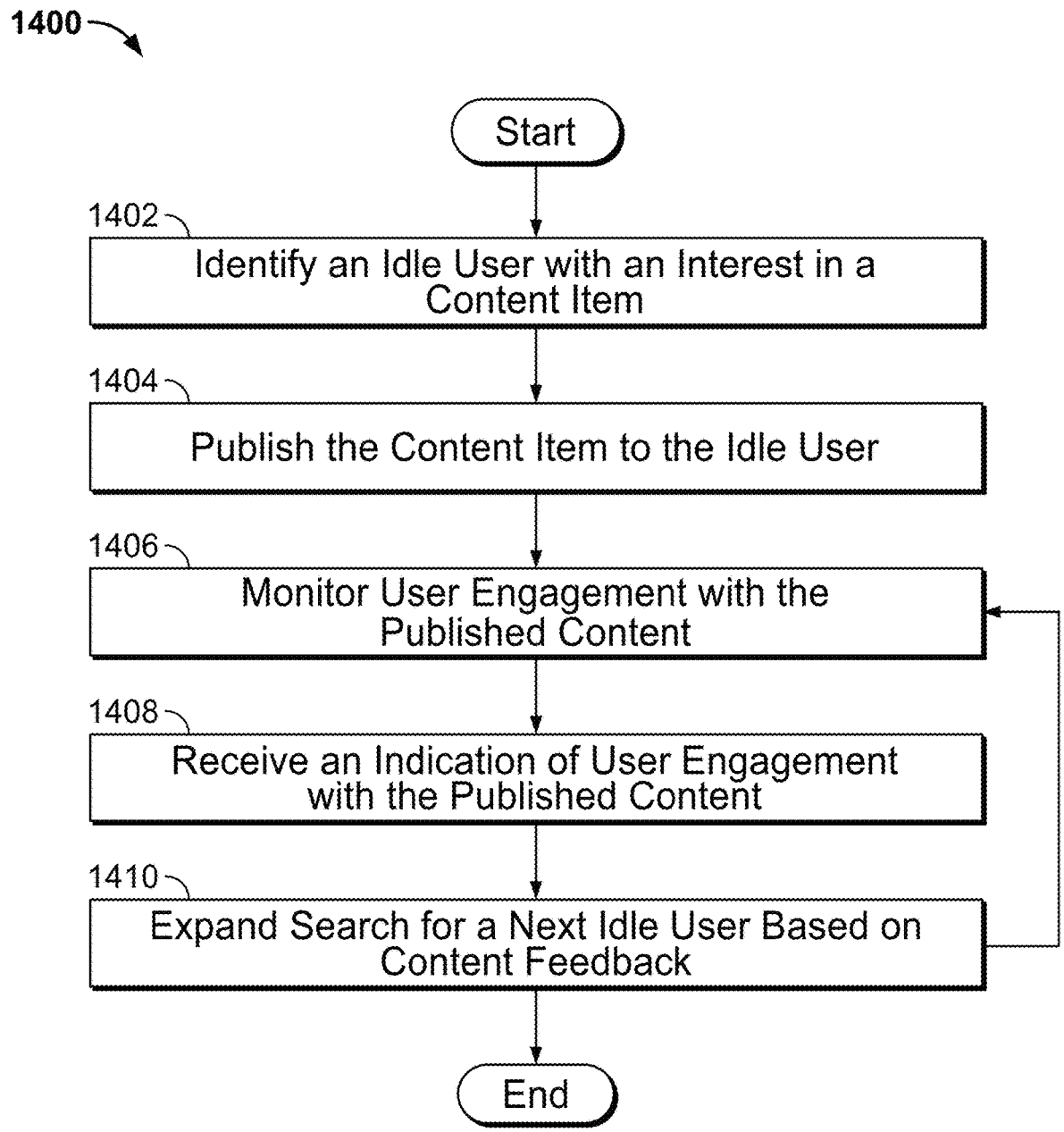
FIG. 14 depicts an illustrative flowchart of a process of searching for and identifying an idle user, in accordance with some embodiments of the disclosure.

FIG. 14 depicts an illustrative flowchart of a process of searching for and identifying an idle user, in accordance with some embodiments of the disclosure. The process 1400 may be used with regard to the previous methods to identify users, the description of FIGS. 11 to 13B is therefore considered included within process 1400. In addition, process 1400 is considered an illustrative flowchart of the description of the flow of data with regard to FIGS. 1 and 2. Process 1400 starts at step 1402. At step 1402, an idle user with an interest in a content item is identified.

At step 1404, the content item is published to the idle user. At step 1406, user engagement with the published content is monitored. At step 1408, an indication of user engagement with the published content is received. In some examples, control circuitry within the computing device 102 receives feedback on the content item uploaded from computing devices 108, as described with regard to FIG. 1 by way of content sharing platform(s) 204 and communication network 208. In some examples, receiving an indication of user engagement with the published content comes from computing devices 108A-B of FIG. 1 by way of the communication network 106 or content sharing platform(s) 204 and communication network 208.

At step 1410, the search for the next idle user is expanded based on content feedback. After step 1410, process 1400 may end or return to step 1406 wherein user engagement is continually monitored, an indication of user engagement is received and the search is expanded.

Throughout this specification, and in some examples, the term virality as used herein may have a time-based component to it. For instance, virality scores as described herein, such as the virality score computed at 310 or the engagement score calculated 1110 or 1204, may be computed based at least in part on a time-based component, such as a rate of change, per unit of time, of a number of likes, dislikes, shares, comments, and/or views indicated for the content item by the content sharing platform, or some other indicator of the popularity of the content item.

Figure 15:
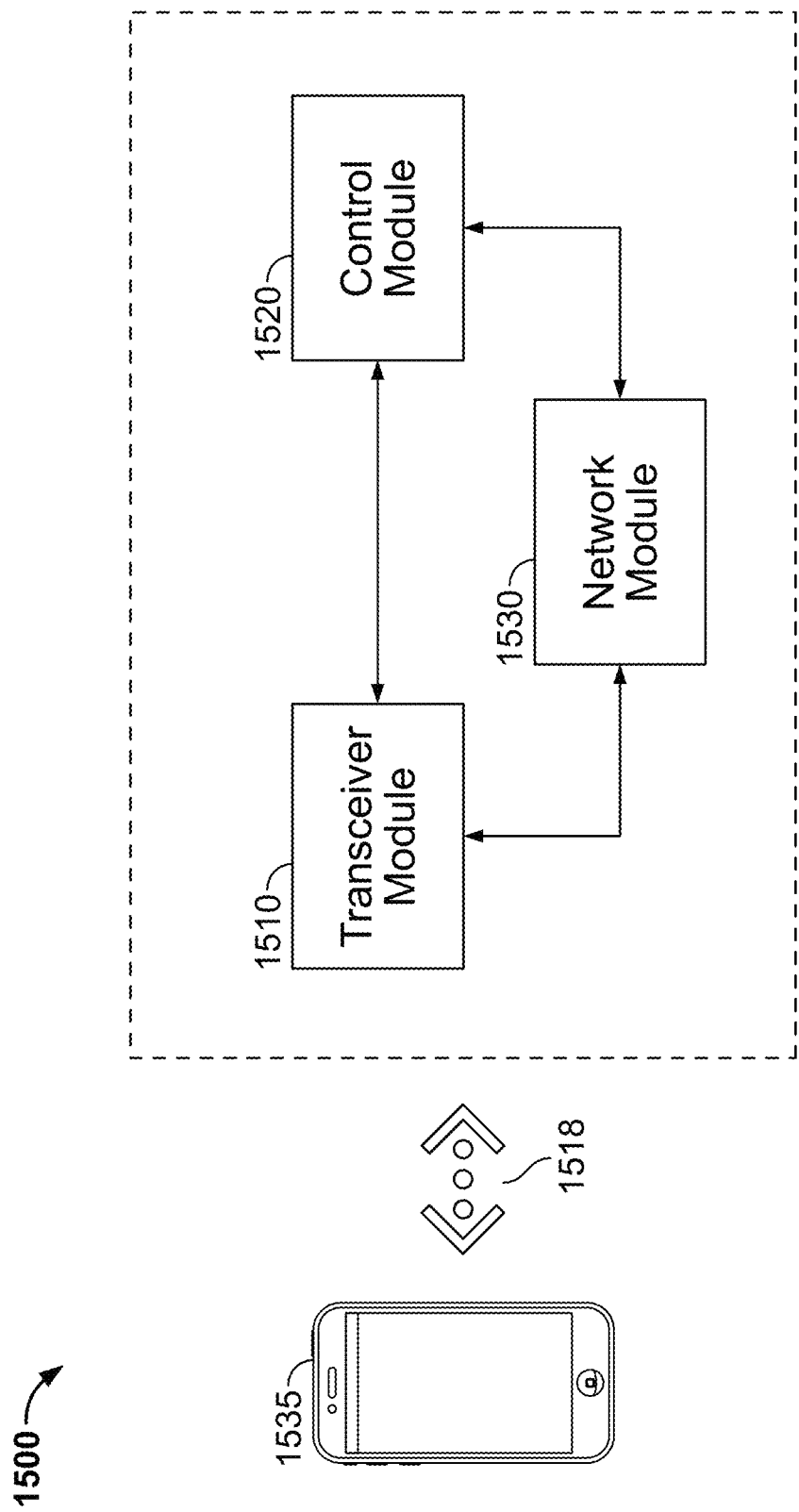
FIG. 15 illustrates an exemplary media transmission device, in accordance with some embodiments of the disclosure.

FIG. 15 illustrates an exemplary media transmission device, in accordance with some embodiments of the disclosure. The media transmission system 1500 comprises a transceiver module 1510, a control module 1520, and a network module 1530. The media transmission system may communicate with an additional user device 1535, such as a home game way, smartphone, or other smart devices. In some examples, the transceiver module 1510 is configured to request, to receive, from at least one application on a user device, a content item. In some examples, the content item may be viewed on a media transmission system 1500 and originate from a server such as a server 1602, as described with reference to FIG. 16. In which case media transmission device 1500 simply sends engagement data back to server 1602.

In some examples, the media transmission device 1500 may also be configured to collect first data from a first content item; collect second data from a second content item; plot a continuous probability distribution of the first data; plot a continuous probability distribution of the second data; calculate, using the continuous probability distribution of the first data and the second data, a virality score for a third content item; and in response to the virality score being greater than a first threshold, classify the third content item as likely to be viral and queueing the third content item for auto-publishing.

In some examples, the transceiver module communicates with a second user device 1535 via communication link 1518. The communication link 1518 between the transceiver module 1510 and the second user device 1535 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the communication link 1518 is between the media transmission device 1500 and a home gateway device, which is in turn in communication with the second user device 1535. In some examples, the home gateway device may receive the content item and then transmit the content item to the second user device 1535. However, these examples are considered to be non-limiting and other combinations of the features herein being spread over two or more devices are considered within the scope of this disclosure. For example, each of the transceiver module, the network module, and the control module may be separate internet of things (IoT) devices that each carry out a portion of the methods herein. Collectively, these devices may be referred to as a system.

Figure 16:
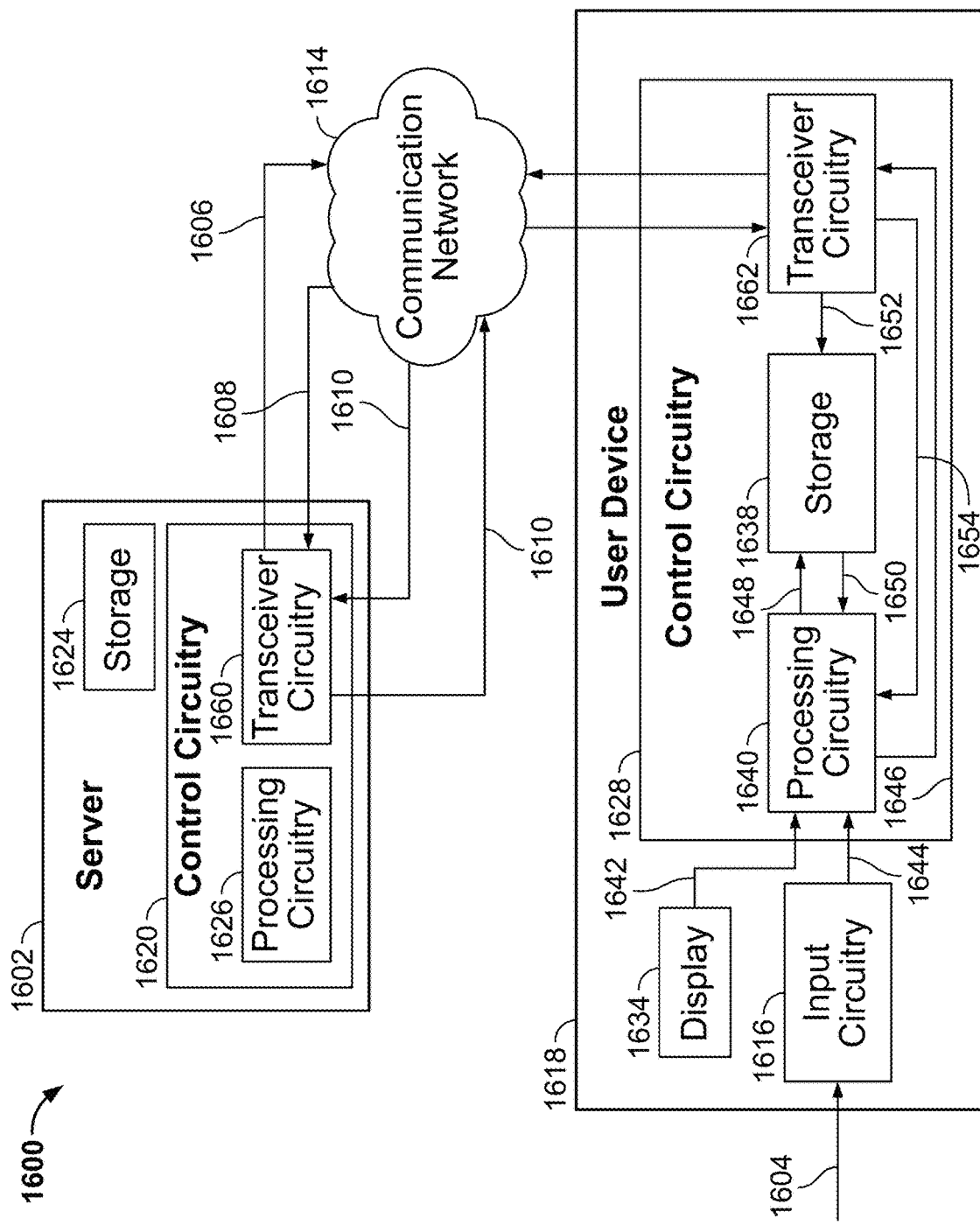
FIG. 16 is a block diagram representing devices, components of each device, and data flow therebetween for a system for publishing content to a server via a communication network, in accordance with some embodiments of the disclosure.

FIG. 16 is a block diagram representing devices, components of each device, and data flow therebetween for an adaptive video streaming system, in accordance with some embodiments of the disclosure. System 1600 is shown to include a client device 1618, a server 1602, and a communication network 1614. It is understood that while a single instance of a component may be shown and described relative to FIG. 16, additional instances of the component may be employed. For example, server 1602 may include or may be incorporated in, more than one server. Similarly, communication network 1614 may include or may be incorporated in, more than one communication network. Server 1602 is shown communicatively coupled to client device 1618 through communication network 1614. While not shown in FIG. 16, server 1602 may be directly communicatively coupled to client device 1618, for example, in a system absent or bypassing communication network 1614.

In some examples, the content item is selectable and the user can interact with it during and after uploading to the server 1602 and comprises information regarding the streaming of media content on a user device or a network device. For example, a user device or a network device (e.g., a laptop, PC, smartphone, smart TV, or the like) may be provided with a content item by a media server 1602 and, after the user interacts with the content item, the engagement information may be retrieved or received from the user device. In some examples, the media content is an adaptive bitrate stream compatible with the MPEG-DASH standard, or other implementations such as Apple HLS. In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication network 1614 may comprise one or more network systems, such as, without limitation, an internet, LAN, WIFI, or other network systems suitable for audio processing applications. In some embodiments, system 1600 excludes server 1602, and functionality that would otherwise be implemented by server 1602 is instead implemented by other components of system 1600, such as one or more components of communication network 1614. In still other embodiments, server 1602 works in conjunction with one or more components of communication network 1614 to implement certain functionality described herein in a distributed or cooperative manner. Similarly, in some embodiments, system 1600 excludes client device 1618, and functionality that would otherwise be implemented by the client device 1618 is instead implemented by other components of system 1600, such as one or more components of communication network 1614 or server 1602 or a combination. In still other embodiments, the client device 1618 works in conjunction with one or more components of communication network 1614 or server 1602 to implement certain functionality described herein in a distributed or cooperative manner.

The client device 1618 includes control circuitry 1628, display 1634, and input-output circuitry 1616. Control circuitry 1628 in turn includes transceiver circuitry 1662, storage 1638, and processing circuitry 1640. In some embodiments, client device 1618 or control circuitry 1628 may be configured as user device 1635 of FIG. 16.

Server 1602 includes control circuitry 1620 and storage 1624. Each of the storages 1624 and 1638 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1624, 1638 may be used to store various types of content, media data, and or other types of data (e.g., they can be used to store media content such as audio, video, and advertisement data). The non-volatile memory may also be used (e.g., to launch a boot-up routine and other instructions). Cloud-based storage may be used to supplement storages 1624, 1638 or instead of storages 1624, 1638. In some embodiments, the pre-encoded or encoded media content, in accordance with the present disclosure, may be stored on one or more of storages 1624, 1638.

In some embodiments, control circuitry 1620 and/or 1628 executes instructions for an application stored on the memory (e.g., storage 1624 and/or storage 1638). Specifically, control circuitry 1620 and/or 1628 may be instructed by the application to perform the functions discussed herein. In some implementations, any action performed by control circuitry 1620 and/or 1628 may be based on instructions received from the application. For example, the application may be implemented as software or a set of executable instructions that may be stored on storage 1624 and/or 1638 and executed by control circuitry 1620 and/or 1628. In some embodiments, the application may be a client/server application where only a client application resides on client device 1618, and a server application resides on server 1602.

The application may be implemented using any suitable architecture. For example, it may be a stand-alone application wholly implemented on client device 1618. In such an approach, instructions for the application are stored locally (e.g., in storage 1638), and data for use by the application is downloaded periodically (e.g., from an out-of-band feed, from an internet resource, or using another suitable approach). Control circuitry 1628 may retrieve instructions for the application from storage 1638 and process the instructions to perform the functionality described herein. Based on the processed instructions, control circuitry 1628 may determine a type of action to perform in response to input received from the input/output path (or input-output circuitry) 1616 or the communication network 1614. For example, in response to a receiving a content item on the client device 1618, control circuitry 1628 may perform the steps of processes as described with reference to various examples discussed herein.

In client/server-based embodiments, control circuitry 1628 may include communication circuitry suitable for communicating with an application server (e.g., server 1602) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1614). In another example of a client/server-based application, control circuitry 1628 runs a web browser that interprets web pages provided by a remote server (e.g., server 1602). For example, the remote server may store the instructions for the application in a storage device. The remote server may process the stored instructions using circuitry (e.g., control circuitry 1628) and/or generate displays. Client device 1618 may receive the displays generated by the remote server and may display the content of the displays locally via display 1634. This way, the processing of the instructions is performed remotely (e.g., by server 1602) while the resulting displays, such as the display windows described elsewhere herein, are provided locally on the client device 1618. Client device 1618 may receive inputs from the user via input circuitry 1616 and transmit those inputs to the remote server for processing and generating the corresponding displays. Alternatively, client device 1618 may receive inputs from the user via input circuitry 1616 and process and display the received inputs locally, by control circuitry 1628 and display 1634, respectively.

Server 1602 and client device 1618 may transmit and receive content and data such as media content via communication network 1614. For example, server 1602 may be a media content provider, and client device 1618 may be a smart television configured to download or stream media content, such as a YouTube video, from server 1602. Control circuitry 1620, 1628 may send and receive commands, requests, and other suitable data through communication network 1614 using transceiver circuitry 1660, 1662, respectively. Control circuitry 1620, 1628 may communicate directly with each other using transceiver circuitry 1660, 1662, respectively, avoiding communication network 1614.

It is understood that client device 1618 is not limited to the embodiments and methods shown and described herein. In non-limiting examples, the client device 1618 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1620 and/or 1618 may be based on any suitable processing circuitry such as processing circuitry 1626 and/or 1640, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1620 and/or control circuitry 1618 are configured to implement a media content operation system, such as systems, or parts thereof, that perform various media content manipulation processes described herein.

Client device 1618 receives a user input 1604 at input circuitry 1616. For example, client device 1618 may receive a user input like a user swipe or user touch, as previously discussed. In some embodiments, client device 1618 is a media device (or player), with the capability to access media content. It is understood that client device 1618 is not limited to the embodiments and methods shown and described herein. In non-limiting examples, the client device 1618 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1604 may be received from a user selection-capturing interface that is separate from device 1618, such as a remote-control device, trackpad, or any other suitable user movement sensitive or capture devices, or as part of device 1618, such as a touchscreen of display 1634. Transmission of user input 1604 to client device 1618 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 1616 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1640 may receive input 1604 from input circuit 1616. Processing circuitry 1640 may convert or translate the received user input 1604 that may be in the form of gestures or movement to digital signals. In some embodiments, input circuit 1616 performs the translation to digital signals. In some embodiments, processing circuitry 1640 (or processing circuitry 1626, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of publishing content, the method comprising: receiving, at a multimedia platform, a content item for publication on the multimedia platform;
    detecting a first plurality of devices of idle users communicatively connected to the multimedia platform within a first radius, wherein a particular user is detected as idle when the particular user is determined to be engaged with the multimedia platform and a device of the particular user has not received a user interface input selecting a content item that is to be generated for display;
    in response to detecting the first plurality of devices of idle users communicatively connected to the multimedia platform within a first radius, publishing the content item to the first plurality of devices of idle users via the multimedia platform;
    collecting first data of an interaction of the first plurality of devices of idle users with the content item on the multimedia platform;
    calculating an engagement score based on the first data; and
    in response to the engagement score being above a first threshold, detecting a second plurality of devices of idle users connected to the multimedia platform within a second radius, wherein the second radius is larger than the first radius and publishing the content item to the second plurality of devices of idle users.

2. The method of claim 1, further comprising:
    determining a location associated with the content item; and
    wherein the first and second radius are concentric with the location associated with the content item.

3. The method of claim 2, wherein the location is determined by: receiving an indication of the location from the devices of idle users, detecting location metadata, or via a GPS system.

4. The method of claim 1, further comprising:
    collecting second data of an interaction of the second plurality of devices of idle users with the content item;
    updating the engagement score based on the second data; and
    in response to the engagement score being above a second threshold, detecting a third plurality of devices of idle users connected to the multimedia platform within a third radius, wherein the third radius is larger than the second radius and publishing the content item to the third plurality of devices of idle users.

5. The method of claim 4, wherein the first data comprises: a number of likes, a number of dislikes, a number of comments, a number of views, a representation of user engagement, a watch time, a number of shares, an indication of music, an identification of an object, an identification of a place, an identification of people, and identification of an animal, an identification of an action, an identification of writing, an identification of known landmarks, length of the content item, a topic of the content item, or natural language processing data.

6. A media device comprising control circuitry, the control circuitry configured to:
    receive a content item for publication on a multimedia platform;
    detect a first plurality of devices of idle users communicatively connected to the multimedia platform within a first radius, wherein a particular user is detected as idle when the particular user is determined to be engaged with the multimedia platform and a device of the particular user has not received a user interface input selecting a content item that is to be generated for display;
    in response to detecting the first plurality of devices connected with idle users communicatively connected to the multimedia platform within a first radius, publish the content item to the first plurality of devices connected with idle users via the multimedia platform;
    collect first data of an interaction of the first plurality of devices of idle users with the content item on the multimedia platform;
    calculate an engagement score based on the first data; and
    in response to the engagement score being above a first threshold, detect a second plurality of devices of idle users of the multimedia platform within a second radius, wherein the second radius is larger than the first radius, and publish the content item to the second plurality of devices of idle users.

7. The media device of claim 6, further comprising:
    determining a location associated with the content item; and
    wherein the first and second radius are concentric with the location associated with the content item.

8. The media device of claim 7, wherein the location is determined by: receiving an indication of the location from the devices of idle users, detecting location metadata, or via a GPS system.

9. The media device of claim 6, further comprising:
    collect second data of an interaction of the second plurality of devices of idle users with the content item;
    update the engagement score based on the second data; and
    in response to the engagement score being above a second threshold, detect a third plurality of devices of idle users of the multimedia platform within a third radius, wherein the third radius is larger than the second radius, and publish the content item to the third plurality of devices of idle users.

10. The media device of claim 9, wherein the first data comprises: a number of likes, a number of dislikes, a number of comments, a number of views, a representation of user engagement, a watch time, a number of shares, an indication of music, an identification of an object, an identification of a place, an identification of people, and identification of an animal, an identification of an action, an identification of writing, an identification of known landmarks, length of the content item, a topic of the content item, or natural language processing data.

11. A non-transitory computer-readable medium having instructions encoded thereon for carrying out a method, the method comprising:
  receiving, at a multimedia platform, a content item for publication on the multimedia platform;
  detecting a first plurality of devices of idle users communicatively connected to the multimedia platform within a first radius, wherein a particular user is detected as idle when the particular user is determined to be engaged with the multimedia platform and a device of the particular user has not received a user interface input selecting a content item that is to be generated for display;
  in response to detecting the first plurality of devices of idle users communicatively connected to the multimedia platform within a first radius, publishing the content item to the first plurality of devices of idle users via the multimedia platform;
  collecting first data of an interaction of the first plurality of devices of idle users with the content item on the multimedia platform;
  calculating an engagement score based on the first data; and
  in response to the engagement score being above a first threshold, detecting a second plurality of devices of idle users connected to the multimedia platform within a second radius, wherein the second radius is larger than the first radius and publishing the content item to the second plurality of devices of idle users.

12. The non-transitory computer-readable medium of claim 11, further comprising:
  determining a location associated with the content item; and
  wherein the first and second radius are concentric with the location associated with the content item.

13. The method of claim 1, wherein in response to detecting the first plurality of devices of idle users communicatively connected to the multimedia platform within a first radius, publishing the content item only to devices within the first plurality of devices of idle users via the multimedia platform.

14. A media device of claim 6, wherein the control circuitry is further configured to in response to detecting the first plurality of devices of idle users communicatively connected to the multimedia platform within a first radius, publish the content item only to devices within the first plurality of devices of idle users via the multimedia platform.

15. The non-transitory computer-readable medium of claim 11, wherein in response to detecting the first plurality of devices of idle users communicatively connected to the multimedia platform within a first radius, publishing the content item only to devices within the first plurality of devices of idle users via the multimedia platform.

16. The method of claim 1, wherein determining that an idle user is engaged with the multimedia platform comprises determining that the idle user is watching content displayed on the multimedia platform without actively selecting which content to watch.

17. The media device of claim 6, wherein determining that an idle user is engaged with the multimedia platform comprises determining that the idle user is watching content displayed on the multimedia platform without actively selecting which content to watch.

18. The non-transitory computer-readable medium of claim 11, wherein determining that an idle user is engaged with the multimedia platform comprises determining that the idle user is watching content displayed on the multimedia platform without actively selecting which content to watch.

* * * * *